(12) United States Patent
Yang et al.

(10) Patent No.: US 12,184,375 B2
(45) Date of Patent: Dec. 31, 2024

(54) CODING METHOD, DECODING METHOD, AND DEVICE

(71) Applicant: VIVO MOBILE COMMUNICATION CO., LTD., Guangdong (CN)

(72) Inventors: Ang Yang, Dongguan (CN); Peng Sun, Dongguan (CN); Rakesh Tamrakar, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 384 days.

(21) Appl. No.: 17/719,477

(22) Filed: Apr. 13, 2022

(65) Prior Publication Data

US 2022/0247472 A1 Aug. 4, 2022

Related U.S. Application Data

(63) Continuation of application No. PCT/CN2020/121271, filed on Oct. 15, 2020.

(30) Foreign Application Priority Data

Oct. 16, 2019 (CN) .......................... 201910985280.9

(51) Int. Cl.
*H04W 4/00* (2018.01)
*H04B 7/0417* (2017.01)
(Continued)

(52) U.S. Cl.
CPC ......... *H04B 7/0639* (2013.01); *H04B 7/0417* (2013.01); *H04B 7/0626* (2013.01); *H04L 5/0051* (2013.01)

(58) Field of Classification Search
CPC ... H04B 7/0417; H04B 7/0639; H04B 7/0626
See application file for complete search history.

(56) References Cited

U.S. PATENT DOCUMENTS 8,879,655 B2 11/2014 Zhang et al.
2010/0091893 A1* 4/2010 Gorokhov ............. H04W 24/10
455/69

(Continued)

FOREIGN PATENT DOCUMENTS

CN 101873207 A 10/2010
CN 104321983 A 1/2015

(Continued)

OTHER PUBLICATIONS

International Search Report and Written Opinion of the International Searching Authority regarding International Patent Application No. PCT/CN2020/121271, dated Jan. 18, 2021. Translation provided by Bohui Intellectual Property.
"CSI feedback mechanism on PUCCH," ZTE, 3GPP TSG RAN WG1 NR AdHoc #2, R1-1710190, dated Jun. 30, 2017.
"On hybrid CSI report: from LTE MIMO to NR MIMO," Nokia, et al., 3GPP TSG-RAN WG1 #88bis, R1-1705993, dated Apr. 7, 2017.
"Differential PMI Feedback for Overhead Reduction in LTE-A DL MIMO," Pantech&Curitel, 3GPP TSG-RAN WG1 #58, R1-093453, dated Aug. 28, 2009.

(Continued)

*Primary Examiner* — Elisabeth Benoit Magloire
(74) *Attorney, Agent, or Firm* — Harness, Dickey & Pierce, P.L.C.

(57) ABSTRACT

A coding method includes: reporting N precoding matrix indicators (PMIs) to a network device; where each PMI is corresponding to one channel; a first PMI includes channel information of a channel corresponding to a second PMI; and the first PMI is one of the N PMIs, the second PMI is at least one PMI before the first PMI, and N is a positive integer greater than 1.

20 Claims, 4 Drawing Sheets

(51) Int. Cl.
   *H04B 7/06*   (2006.01)
   *H04L 5/00*   (2006.01)

(56) References Cited

U.S. PATENT DOCUMENTS

| | | | |
|---|---|---|---|
| 2010/0099364 A1 | 4/2010 | Yang et al. | |
| 2012/0207105 A1* | 8/2012 | Geirhofer | H04L 5/0032 |
| | | | 370/329 |
| 2013/0083758 A1 | 4/2013 | Kim et al. | |
| 2013/0115985 A1* | 5/2013 | Davydov | H04B 7/0632 |
| | | | 455/501 |
| 2013/0188623 A1* | 7/2013 | Chen | H04L 1/0028 |
| | | | 370/336 |
| 2014/0119213 A1 | 5/2014 | Devarasetty | |
| 2017/0332374 A1* | 11/2017 | Koorapaty | H04L 5/001 |
| 2018/0212727 A1 | 7/2018 | Davydov et al. | |
| 2018/0262244 A1 | 9/2018 | Noh et al. | |
| 2018/0262245 A1 | 9/2018 | Li et al. | |
| 2019/0059013 A1 | 2/2019 | Rahman et al. | |
| 2019/0074885 A1* | 3/2019 | Chen | H04B 7/0478 |

FOREIGN PATENT DOCUMENTS

| | | |
|---|---|---|
| JP | 2012080522 A | 4/2012 |
| WO | WO-2018231997 A1 | 12/2018 |

OTHER PUBLICATIONS

First Office Action regarding Indian Patent Application No. 202217021191, dated Oct. 11, 2022.
First Office Action regarding Chinese Patent Application No. 201910985280.9, dated Aug. 26, 2023. Translation provided by Bohui Intellectual Property.
Supplementary European Search Report regarding European Patent Application No. 20877670.8-1206, dated Oct. 17, 2022.
First Office Action regarding Japanese Patent Application No. 2022-522063, dated Apr. 28, 2023. Translation provided by Bohui Intellectual Property.

* cited by examiner

CODING METHOD, DECODING METHOD, AND DEVICE

CROSS-REFERENCE TO RELATED APPLICATIONS

This application is a Bypass Continuation Application of PCT/CN2020/121271 filed on Oct. 15, 2020, which claims priority to Chinese Patent Application No. 201910985280.9 filed on Oct. 16, 2019, which are incorporated herein by reference in their entirety.

TECHNICAL FIELD

This application relates to the field of communications technologies, and in particular, to a coding method, a decoding method, and a device.

BACKGROUND

For a multi-input multi-output (MIMO) system, a transmit end device may optimize sending of a signal based on channel state information (CSI), so that a degree of matching between the signal and a channel state is higher. For example, a precoding matrix indicator (PMI) may be used to implement eigen beamforming, thereby increasing strength of a received signal or inhibiting interference between cells or user equipments (UE).

SUMMARY

According to a first aspect, an embodiment of the present application provides a coding method, applied to a UE, and the method includes: reporting N PMIs to a network device; where each PMI is corresponding to one channel; a first PMI includes channel information of a channel corresponding to a second PMI; and the first PMI is one of the N PMIs, the second PMI is at least one PMI before the first PMI, and N is a positive integer greater than 1.

According to a second aspect, an embodiment of the present application provides a decoding method, applied to a network device, where the method includes: decoding N PMIs received from a UE to obtain channel information of N channels; where each PMI is corresponding to channel information of one channel; a first PMI includes channel information of a channel corresponding to a second PMI; the first PMI is one of the N PMIs; and the second PMI is at least one PMI before the first PMI, and N is a positive integer greater than 1.

According to a third aspect, an embodiment of the present application provides a decoding method, applied to a network device, and the method includes: decoding, by using Y decoding modules, N PMIs received from a UE to obtain channel information of N channels; where some or all of the Y decoding modules are different; and N and Y are positive integers greater than 1.

According to a fourth aspect, an embodiment of the present application provides a UE, where the UE includes a sending module, and the sending module reports N PMIs to a network device; where each PMI is corresponding to one channel; a first PMI includes channel information of a channel corresponding to a second PMI; the first PMI is one of the N PMIs; and the second PMI is at least one PMI before the first PMI, where N is a positive integer greater than 1.

According to a fifth aspect, an embodiment of the present application provides a network device, where the network device includes a decoding unit, configured to decode N PMIs received from a user equipment (UE) to obtain channel information of N channels; where each PMI is corresponding to channel information of one channel; a first PMI includes channel information of a channel corresponding to a second PMI; the first PMI is one of the N PMIs; and the second PMI is at least one PMI before the first PMI, and N is a positive integer greater than 1.

According to a sixth aspect, an embodiment of the present application provides a decoding method, applied to a network device. The network device includes: a decoding unit, configured to decode, by using Y decoding modules, N PMIs received from a user equipment (UE) to obtain channel information of N channels; where any decoding module is corresponding to at least one of the N PMIs; some or all of the Y decoding modules are different; and N and Y are positive integers greater than 1.

According to a seventh aspect, an embodiment of the present application provides a terminal device, including a processor, a memory, and a computer program stored in the memory and executable on the processor, where when the computer program is executed by the processor, the steps of the coding method according to the first aspect are implemented.

According to an eighth aspect, an embodiment of the present application provides a network device, including a processor, a memory, and a computer program stored in the memory and executable on the processor, where when the computer program is executed by the processor, the steps of the decoding method according to the second aspect are implemented.

According to a ninth aspect, an embodiment of the present application provides a network device, including a processor, a memory, and a computer program stored in the memory and executable on the processor, where when the computer program is executed by the processor, the steps of the decoding method according to the third aspect are implemented.

According to a tenth aspect, an embodiment of the present application provides a non-transitory computer readable storage medium, where the non-transitory computer readable storage medium stores a computer program, and when the computer program is executed by a processor, the steps of the coding method and the decoding method are implemented.

DETAILED DESCRIPTION

Figure 1:
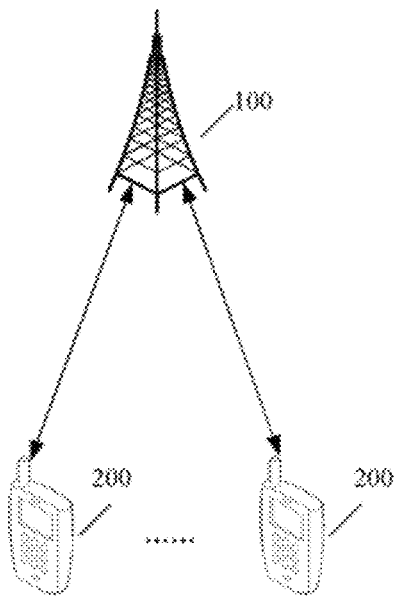
FIG. 1 is a possible schematic structural diagram of a communications system according to an embodiment of the present application.

The following clearly describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application shall fall within the protection scope of the present application.

It is to be noted that "I" in this text means "or", for example, A/B can mean A or B; The term "and/or" in this specification describes only an association relationship for describing associated objects and represents that three relationships may exist. For example, A and/or B may represent the following three cases: Only A exists, both A and B exist, and only B exists.

It is to be noted that for ease of describing the technical solutions in the embodiments of this application clearly, in the embodiments of this application, words such as "first" and "second" are used to distinguish same or similar items with a basically same function and role. A person of ordinary skill in the art can understand that the words such as "first" and "second" do not define the amount and the operating sequence. For example, a first coding module and a second coding module are used to distinguish between different coding modules, but not to describe a specific sequence of coding modules.

It is to be noted that in the embodiments of the present application, the word "exemplary" or "for example" is used to represent giving an example, an illustration, or a description. Any embodiment or design scheme described as an "exemplary" or "for example" in the embodiments of the present application should not be explained as being more preferred or having more advantages than another embodiment or design scheme.

It is to be noted that in the embodiments of this application, "of", "relevant" and "corresponding" may be mixed during use sometimes. It should be noted that when a difference thereof is de-emphasized, meanings expressed by them are the same. In the embodiments of this application, "plurality" means two or more.

The technical solutions provided in the present application may be applied to various communications systems, such as a 5G communications system, a future evolved system, or a plurality of communications fusion systems. The technical solutions may include a plurality of application scenarios, such as machine to machine (M2M), D2M, macro-micro communications, enhanced mobile broadband (eMBB), ultra-reliable and low latency communications (uRLLC), and massive machine type communication (mMTC). These scenarios include but are not limited to a scenario in which a terminal device communicates with a terminal device, a network device communicates with a network device, or a network device communicates with a terminal device. The embodiments of the present application may be applied to communication between a network device and a terminal device in a 5G communications system, communication between a terminal device and a terminal device, or communication between a network device and a network device.

FIG. 1 is a possible schematic structural diagram of a communications system according to an embodiment of the present application. As shown in FIG. 1, the communications system includes at least one network device 100 (only one network device 100 is in shown FIG. 1) and one or more terminal devices 200 connected to each network device 100.

The network device 100 may be a base station, a core network device, a transmission and reception point (TRP), a relay node, an access point, or the like. The network device 100 may be a base transceiver station (BTS) in a global system for mobile communications (GSM) or a code division multiple access (CDMA) network, or may be an NB (NodeB) in wideband code division multiple access (WCDMA), or may be an eNB or an eNodeB in LTE. Alternatively, the network device 100 may further be a radio controller in a cloud radio access network (CRAN) scenario. Alternatively, the network device 100 may be a network device in a 5G communication system or a network device in a future evolved network. However, these words do not constitute a limitation on the present application.

The terminal device 200 may be a wireless terminal device or may be a wired terminal device. The wireless terminal device may be a device that provides voice and/or other service data connectivity to a user, a handheld device with a wireless communication function, a computing device, another processing device connected to a wireless modem, an in-vehicle device, a wearable device, a terminal device in a future 5G network, or a terminal device in a future evolved PLMN network. The wireless terminal device may communicate with one or more core networks by using a radio access network (RAN). The wireless terminal device may be a mobile terminal device, such as a mobile phone (or referred to as a "cellular" phone) and a computer with a mobile terminal device. For example, the wireless terminal device may be a portable, pocket-sized, handheld, computer-built-in or in-vehicle mobile apparatus, which exchanges voice and/or data with a wireless access network. The wireless terminal device may be a personal communication service (PCS) phone, a cordless phone, a session initiation protocol (SIP) phone, a wireless local loop (WLL) station, or a personal digital assistant (PDA) device. The wireless terminal device may alternatively be a mobile device, a user equipment (UE), a UE terminal device, an access terminal device, a wireless communication device, a terminal device unit, a terminal device station, a mobile station, a mobile console, a remote station, a remote station, a remote terminal device, a subscriber unit, a subscriber station, a user agent, a terminal device apparatus, or the like. In an example, in this embodiment of the present application, FIG. 1 shows an example in which the terminal device is a mobile phone.

In the prior art communications technologies, accurate CSI is critical to a channel capacity. For example, for a MIMO system, a transmit end device may optimize sending of a signal based on CSI, so that the signal better matches a channel state. Therefore, CSI acquisition has been a research hotspot since the multi-antenna technology is proposed. For example, when channel reciprocity does not exist, for example, in a frequency division duplexing (FDD) system, an uplink channel represented by an SRS cannot accurately learn of downlink channel information. In this case, a channel state information reference signal (CSI-RS) needs to be sent to a UE. The UE performs channel estimation based on the CSI-RS to obtain downlink channel information, and then transmits a PMI to a network device by using a codebook specified in a protocol. The network device may recover the downlink channel information based on the codebook and the PMI.

A current codebook is divided into a Type I codebook and a Type II codebook. A core idea of the codebooks is to construct a codeword based on an oversampled 2D DFT beam by using a rule, and then indicate a codeword in the codebook by using bit information of a PMI, so as to retrieve a corresponding channel vector or matrix. For example, a precoding matrix W in a Type I single-panel CSI codebook may be represented as a product of two matrices W1 and W2, and information about W1 and W2 is separately reported. W1 represents a long-term and frequency-independent channel characteristic. The UE reports at least one W1 for an entire reporting bandwidth, and W2 attempts to capture a short-term and frequency-related channel characteristic. The UE reports one W2 for each subband, or does not report W2. W1 and W2 are composed of oversampled 2D DFT beams. In addition, a difference between Type II and Type I lies in that Type I finally reports only one beam, and Type II reports up to four orthogonal beams. For each beam and two polarization directions of the beam, a reported PMI provides a corresponding amplitude value (broadband and subband) and a phase value (subband). In this way, Type II captures a main propagation path and a corresponding amplitude and phase, thereby providing more detailed channel information. Certainly, the overhead of Type II is also generally greater than that of Type I.

However, when channel information transmission is performed in the foregoing transmission manner, because a legacy codebook is a codebook in a fixed mode and a channel characteristic does not conform to the oversampled 2D DFT beam, accurate CSI cannot be obtained in a channel information transmission process.

Usually, after receiving a PMI sent by a UE, a network device finds corresponding one or more code words in a codebook based on the PMI, and obtains combination information between the code words, so as to obtain corresponding CSI. A conventional codebook includes a Type I codebook and a Type II codebook.

However, because the conventional codebook is constructed based on an oversampled two-dimensional discrete Fourier transform beam (oversampled 2D DFT beam), when CSI is transmitted between a transmit end and a receive end by using the codebook, if a channel feature does not conform to a two-dimensional discrete Fourier transform model, an accurate PMI cannot be obtained, and therefore accurate CSI cannot be obtained.

Embodiments of the present application provide a coding method, a decoding method, and a device. In comparison with a conventional technology in which only channel information and a fixed codebook are used for channel coding, after obtaining a channel, when a UE codes the channel by using a coding module, the UE codes the channel with reference to coding information of a coding module before the coding module. Because the coding information of the coding module before the coding module may reflect correction information, coding precision of the coding module is improved, a PMI with higher precision is obtained, and precise CSI is obtained, thereby improving communication efficiency.

Embodiment 1

Figure 2:
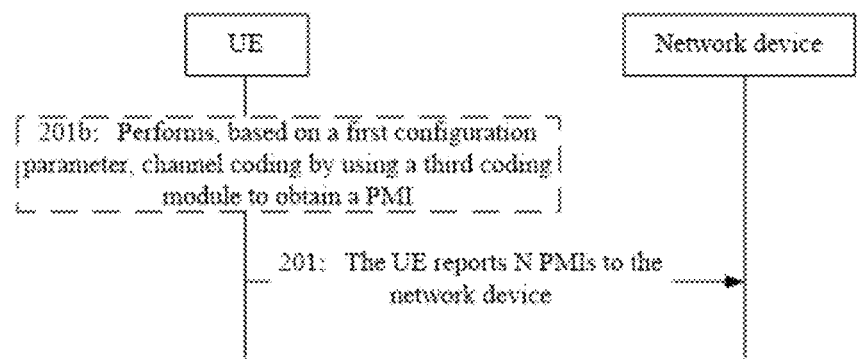
FIG. 2 is a schematic flowchart of a coding method according to an embodiment of the present application.

FIG. 2 is a schematic flowchart of a coding method according to an embodiment of the present application. As shown in FIG. 2, the coding method is applied to a UE, and the coding method may include step 201.

Step 201: The UE reports N PMIs to a network device.

Correspondingly, the peer network device receives the N PMIs.

Each PMI is corresponding to one channel; a first PMI includes channel information of a channel corresponding to a second PMI; the first PMI is one of the N PMIs; and the second PMI is at least one PMI before the first PMI, where N is a positive integer greater than 1.

In this way, after a UE codes a channel, an obtained PMI includes channel information of at least one PMI before the PMI. That is, compared with a conventional technology that only channel information and a fixed codebook are used to code the channel, in the embodiments of the present application, when the channel is coded, channel information of another channel that is previously coded by the UE is combined for coding, thereby improving coding accuracy of the UE, obtaining a PMI with a higher precision, obtaining precise CSI, and improving communication efficiency.

Optionally, in this embodiment of the present application, the N PMIs are corresponding to L coding modules, and any coding module obtains at least one PMI of the N PMIs; coding of a first coding module is based on coding information of a second coding module; the first coding module is one of the L coding modules; and the second coding module is a coding module that performs coding before the first coding module, and L is a positive integer greater than 1.

Optionally, in this embodiment of the present application, any PMI in the N PMIs is obtained by the first coding module by coding a channel corresponding to the any PMI based on the coding information of the second coding module; and the first coding module is a coding module corresponding to the any PMI.

Optionally, in this embodiment of the present application, the L coding modules used by the UE may correspond to Y decoding modules used by the network device. For example, it is assumed that L is 4, that is, a total of four coding modules are used. The UE sequentially uses the four coding modules, that is, a coding module 1, a coding module 2, a coding module 3, and a coding module 4. Correspondingly, Y is 4, that is, the network device also uses four decoding modules, that is, a decoding module 1, a decoding module 2, a decoding module 3, and a decoding module 4. The coding module 1 is corresponding to the decoding module 1, the coding module 2 is corresponding to the decoding module 2, the coding module 3 is corresponding to the decoding module 3, and the coding module 4 is corresponding to the decoding module 4.

Optionally, in this embodiment of the present application, the L coding modules used by the UE may not be completely corresponding to the Y decoding modules used by the network device. For example, it is assumed that L is 4, that is, a total of four coding modules are used, and the UE sequentially uses the four coding modules: a coding module 1, a coding module 2, a coding module 3, and a coding module 4. Correspondingly, Y is 1, that is, the network device uses one decoding module, which is a decoding module 1. When the coding modules perform coding in a sequence of the coding module 1, the coding module 2, the coding module 3, and the coding module 4, the corresponding decoding module repeatedly uses the decoding module 1 to perform decoding.

Optionally, in this embodiment of the present application, the UE may set a maximum quantity of PMIs reported by the UE in one coding period, and the UE may determine a quantity N of coding modules based on the maximum quantity of PMIs reported by the UE. In addition, if the coding module includes a neural network, a training process of the neural network may be performed based on the maximum quantity of PMIs reported by the UE.

Optionally, in this embodiment of the present application, the coding module may include a codebook or another coding module that can perform coding except the codebook. This is not limited in this embodiment of the present application.

In this way, the coding module may be in another form other than a codebook. In a conventional technology, a codebook needs to be used for coding. However, a codebook design needs to be based on a specific antenna model and a channel model. That is, by using the codebook, a multi-antenna system that conforms to a specific antenna model needs to be used. A hardware device is not selected in a flexible manner, and an actual channel does not fully meet an assumed channel model. In this embodiment of the present application, channel transmission may be completed without using a codebook. Therefore, without being limited by a specific structure of a hardware device, it is more flexible to cooperate with various multi-antenna systems, and is more suitable for a complex actual channel environment.

Optionally, in this embodiment of the present application, the coding module may be a coding module trained based on a neural network.

Optionally, in this embodiment of the present application, the coding information of the second coding module includes at least one of: a CSI-RS corresponding to a first channel, intermediate state information for the second coding module to calculate a PMI, time domain correlation information of the CSI-RS, or frequency domain correlation information of the CSI-RS; where the first channel is a channel corresponding to a PMI corresponding to the second coding module.

For example, if the coding module is obtained based on a neural network, the intermediate state information refers to an output of an intermediate layer of the neural network (passing through an activation function or not passing through an activation function). If the coding module is a codebook, the intermediate state information refers to an intermediate result of processing such as transform of a two-dimensional discrete Fourier transform beam/matrix and a combination thereof. The foregoing processing includes operations such as a linear combination of a plurality of beams/matrices, a product, a kroneck product, eigenvalue decomposition, and a combination of these operations.

Optionally, in this embodiment of the present application, the L coding modules are same coding modules. For example, it is assumed that N is 4, that is, a total of four coding modules are used, and a coding module numbered 1 is used each time.

Optionally, in this embodiment of the present application, some or all of the L coding modules are different.

Example 1: Some of the L coding modules are same coding modules. For example, it is assumed that N is 4, that is, a total of four coding modules are used, and a coding module numbered 1 and a coding module numbered 2 are separately used twice.

Example 2: The L coding modules are N different coding modules. It is assumed that N is 4, that is, a total of four coding modules are used, and the UE sequentially uses the four coding modules: a coding module 1, a coding module 2, a coding module 3, and a coding module 4.

In this way, the UE may flexibly select a suitable coding module based on a current application scenario to code channel information. Compared with a conventional PMI coding process in which a fixed coding module is used to code the channel information, resource overheads of the UE are reduced, and communication efficiency is improved.

Optionally, in this embodiment of the present application, PMI bit widths of all or some of the L coding modules are the same, or PMI bit widths of the L coding modules are different. It should be noted that PMI bit widths of same coding modules may be the same or different, and PMI bit widths of different coding modules may be the same or different.

For example, for any coding module, the UE may intercept only a part of PMI bit width information, so as to report only a part of a PMI output by the coding module. In this way, the UE may directly change different PMI bit widths of the coding module based on a current application scenario. Therefore, resource overheads of the UE can be reduced, and communication efficiency can be improved.

Optionally, in this embodiment of the present application, step 201 may include the following step 201*a*.

Step 201*a*: After a first coding period starts, the UE reports the N PMIs to the network device.

For example, the N PMIs are coded in the first coding period.

Optionally, as shown in FIG. 2, step 201 may include the following step 201*b*.

Step 201*b*: The UE performs, based on a first configuration parameter, channel coding by using a third coding module to obtain a PMI.

For example, the third coding module is at least one of the L coding modules.

For example, the first configuration parameter is used to indicate at least one of: the L coding modules, a coding sequence of the L coding modules, a maximum coding time of each coding module, a maximum quantity M of PMIs reported by the UE in one coding period, a PMI bit width of the third coding module, or a trigger condition for starting the first coding period.

For example, the trigger condition for starting the first coding period may include at least one of: a quantity of PMIs cumulatively reported by the UE in a second coding period being greater than the quantity M, the UE receiving first indication information from the network device, the UE sending second indication information to the network device, the UE continuously receiving acknowledgment (ACK) information a plurality of times from the network device, the UE detecting that a beam fails, the UE re-accessing or switching a cell, or a channel state being changed.

For example, the first indication information and the second indication information are used to indicate the UE to start a new coding period, and the second coding period is a previous coding period of the first coding period.

For example, the channel state being changed includes at least one of: a channel environment between the UE and the network device being changed, quality of service required by the UE being changed, the UE detecting that information of a used CSI-RS is changed, the network device detecting that information of a used CSI-RS is changed, or the UE detecting that an antenna state is changed.

For example, the network device detecting that information of a used CSI-RS is changed means that configuration information of a CSI-RS resource set is changed, or configuration information of a new CSI-RS resource set is changed, or a new CSI-RS resource is used.

For example, the first configuration parameter is specified in a protocol, predefined, configuration information used by the UE in a second coding period, or determined by the UE based on target information; where the second coding period is a previous coding period of the first coding period; and the target information is used to indicate at least one of: a channel environment between the UE and the network device, quality of service required by the UE, hardware configuration of the network device, or hardware configuration of the UE.

In an example, the first configuration parameter may be reported by the UE to the network device by using signaling (for example, one or more of radio resource control (RRC), media access control-control element (MAC CE), and uplink control information (UCI)); or configured by the network device for the UE by using signaling (for example, one or more of RRC, a MAC CE, and downlink control information (DCI)).

In an example, the first configuration parameter may be a default configuration specified in a protocol.

In an example, the first configuration parameter is information used to indicate the L coding modules, information used to indicate a coding sequence of coding modules that perform coding in the first coding period, information used to indicate a maximum coding time of the third coding module, information used to indicate a maximum quantity of PMIs reported by the UE in one coding period, information used to indicate a PMI bit width of the third coding module, and information used to indicate a trigger condition for starting the first coding period. For example, the indication information in the first configuration parameter may be reported by the UE to the network device by using signaling (for example, one or more of RRC, a MAC CE, and UCI); or indicated by the network device to the UE by using signaling (for example, one or more of RRC, a MAC CE, and DCI).

For example, the channel environment between the UE and the network device is obtained by the UE by detecting a second channel, or obtained by the network device by detecting a third channel, or obtained by a sensing device of the UE, or obtained by the network device through a CSI report sent by the UE; and/or the target information is obtained by the UE through higher layer signaling. The second channel includes at least one of: a physical downlink control channel (PDCCH), a physical downlink shared channel (PDSCH), a CSI-RS, a demodulation reference signal (DMRS), a phase tracking reference signal (PTRS), a synchronization signal, or a physical broadcast channel (PBCH). The third channel includes at least one of: a physical uplink control channel (PUCCH), a physical uplink shared channel (PUSCH), a physical random access channel (PRACH), a sounding reference signal (SRS), a PTRS, or a DMRS. The sensing device includes at least one of: a global positioning system (GPS), a gyroscope, or another sensor that senses a location, movement, or rotation of the UE, or whether the UE is blocked. The higher layer signaling refers to at least one of: signaling related to hardware configuration of the network device and the UE, signaling related to a channel environment from the network device to the UE, or signaling related to quality of service required by the terminal.

For example, the target information includes first information, and the first information is used to indicate the channel environment between the UE and the network device; where the first information includes at least one of: transmission power, noise power, interference power, line-of-sight (LOS) transmission of a wireless signal, non-line-of-sight (NLOS) transmission of a wireless signal, time delay information, a scattering condition, channel time variation, a terminal moving speed, a terminal rotating speed, or a change speed of a shielding around a terminal; and/or the target information includes second information, and the second information is used to indicate the quality of service required by the UE; and the second information includes at least one of: an electric quantity, a throughput value, time delay information, a size of a data packet that needs to be transmitted, a bit error rate, a signal-to-noise ratio, or a signal to interference plus noise ratio; and/or the target information includes third information, and the third information is used to indicate the hardware configuration of the network device; and the third information includes at least one of: an antenna-related parameter of the network device or a processing capability information parameter of the network device; and/or the target information includes fourth information, and the fourth information is used to indicate the hardware configuration of the UE; and the fourth information includes at least one of: an antenna-related parameter of the UE or a processing capability information parameter of the UE;

where the antenna-related parameter of the network device includes at least one of: a quantity of antenna elements, a quantity of transceiver units (TXRUs), or a quantity of antenna panels; the processing capability information parameter of the network device includes at least one of: a signal processing capability, a data calculation capability, a storage capability, a central processing unit (CPU), a graphics processing unit (GPU), or a natural processing unit (NPU); the antenna-related parameter of the UE includes at least one of: a quantity of antenna elements, a quantity of TXRUs, or a quantity of antenna panels; and the processing capability information parameter of the UE includes at least one of: a signal processing capability, a data calculation capability, a storage capability, a CPU, a GPU, or an NPU.

It should be noted that, the UE may obtain one or more items of the first information by detecting one or more combinations in the second channel; and/or the network device may obtain one or more items of the first information by detecting one or more combinations in the third channel; and/or the network device may obtain at least one of transmission power, noise power, or interference power in the first information through a CSI report sent by the UE; and/or the UE may obtain, through the sensing device of the UE, at least one of a channel time variation, a moving speed of the terminal, a rotating speed of the terminal, or a change speed of a shielding around the terminal in the first information.

Optionally, in this embodiment of the present application, before step 201b, step 201c is further included.

Step 201c: The UE obtains third indication information.

The third indication information is used to indicate the first configuration parameter.

For example, the third indication information is used to indicate a parameter identifier corresponding to the first configuration parameter. Example 1: After obtaining the first configuration parameter, the UE reports the third indication information to the network device, so that the network device may obtain the corresponding first configuration parameter from one or more preconfigured configuration parameters by using the parameter identifier of the first configuration parameter corresponding to the third indication information as an index. Example 2: The UE receives the third indication information from the network device, then obtains the parameter identifier of the first configuration parameter from the third indication information, and then obtains the corresponding first configuration parameter from one or more preconfigured configuration parameters by using the parameter identifier of the first configuration parameter as an index.

For example, the third indication information is used to indicate at least one of: a maximum coding time of each coding module, a maximum quantity of PMIs reported by the UE in one coding period, or a PMI bit width of the third coding module.

For example, the third indication information is used to indicate a change amplitude of each parameter in the first configuration parameter.

It should be noted that, when the UE and the network device simultaneously obtain the third indication information, the network device indicates that the first configuration parameter takes precedence over the UE.

In this way, the UE can flexibly select a plurality of parameter change manners of the UE, and different change manners may be used for different cases. Therefore, resource overheads during coding of the UE can be greatly reduced, and coding efficiency can be improved.

Optionally, in this embodiment of the present application, step 201c may include the following step 201c1.

Step 201c1: The UE obtains the third indication information after a fourth coding module completes coding.

The fourth coding module is a previous coding module of the third coding module, and the fourth coding module is one of the L coding modules.

For example, the third indication information is further used to indicate to change at least one piece of the following information in an original configuration parameter of the third coding module: a PMI bit width of the third coding module, or a maximum quantity of PMIs reported by the UE in one coding period.

Optionally, in this embodiment of the present application, step 201c may include the following step 201c2.

Step 201c2: The UE obtains the third indication information before the first coding period starts.

The first configuration parameter is a changed original configuration parameter of the third coding module.

For example, the third indication information is further used to indicate to change at least one of the following original configuration parameter of the third coding module: a coding sequence of coding modules that perform coding in the first coding period, a maximum coding time of the third coding module, a maximum quantity of PMIs reported by the UE in one coding period, a PMI bit width of the third coding module, or a trigger condition for starting the first coding period; where the first configuration parameter is a changed original configuration parameter of the third coding module.

According to the coding method provided in this embodiment of the present application, in comparison with a conventional technology in which only channel information and a fixed codebook are used for channel coding, after obtaining a channel, when a UE codes the channel by using a coding module, the UE codes the channel with reference to coding information of a previous coding module of the coding module. Because the coding information of the previous coding module of the coding module may reflect correction information, coding precision of the coding module is improved, a PMI with higher precision is obtained, and precise CSI is obtained, thereby improving communication efficiency.

Embodiment 2

Figure 3:
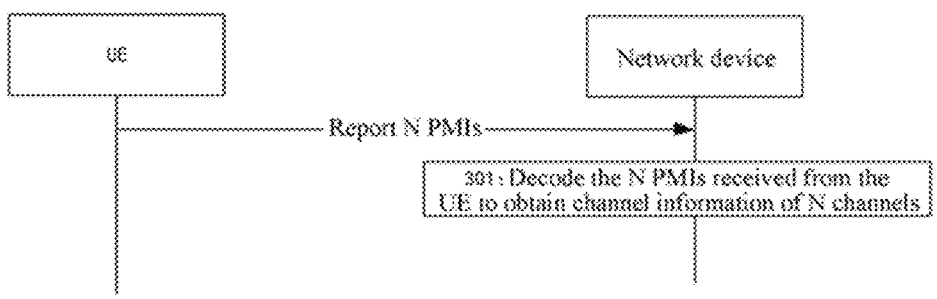
FIG. 3 is a first schematic flowchart of a decoding method according to an embodiment of the present application.

FIG. 3 is a schematic flowchart of a decoding method according to an embodiment of the present application. As shown in FIG. 3, the decoding method is applied to a network device, and the decoding method may include step 301.

Step 301: The network device decodes N PMIs received from a UE to obtain channel information of N channels.

Each PMI is corresponding to channel information of one channel; a first PMI includes channel information of a channel corresponding to a second PMI; the first PMI is one of the N PMIs; and the second PMI is at least one PMI before the first PMI, and N is a positive integer greater than 1.

In this way, compared with a conventional technology in which a channel is decoded by only using channel information and a fixed codebook, in this embodiment of the present application, when the PMI is decoded, any PMI in the N PMIs received by the network device includes channel information of at least one PMI before the any PMI, so that the network device can obtain more accurate CSI, thereby improving communication efficiency.

Optionally, in this embodiment of the present application, step 301 includes step A1.

Step A1: The network device decodes, by using Y decoding modules, the N PMIs received from the UE to obtain the channel information of the N channels.

Any decoding module is corresponding to at least one of the N PMIs; and Y is a positive integer greater than 1.

Optionally, in this embodiment of the present application, the Y decoding modules may be the same.

Optionally, in this embodiment of the present application, some or all of the Y decoding modules are different.

Example 1: Some of the Y decoding modules are same coding modules. For example, it is assumed that Y is 4, that is, a total of four decoding modules are used, and a decoding module numbered 1 and a decoding module numbered 2 are separately used twice.

Example 2: The Y decoding modules are N different decoding modules. It is assumed that N is 4, that is, a total of four decoding modules are used, and the UE sequentially uses the four decoding modules: a decoding module 1, a decoding module 2, a decoding module 3, and a decoding module 4.

In this way, the network device may flexibly select a suitable decoding module based on a current application scenario to decode the PMI. Compared with a conventional PMI decoding process in which a fixed decoding module is used for decoding, resource overheads of the network device are reduced, and communication efficiency is greatly improved.

Optionally, in this embodiment of the present application, decoding of a first decoding module is based on decoding information of a second decoding module and/or coding information of a second coding module; the first decoding module is one of the Y decoding modules; the second decoding module is a decoding module before the first decoding module; and the second coding module is a coding module that performs coding before a coding module corresponding to the first decoding module.

Optionally, in this embodiment of the present application, the first decoding module is obtained by decoding any PMI based on the decoding information of the second decoding module; the first decoding module is a decoding module corresponding to the any PMI; and the second decoding module is a decoding module before the first decoding module.

Optionally, in this embodiment of the present application, the L coding modules used by the UE may correspond to Y decoding modules used by the network device. For example, it is assumed that N is 4, that is, a total of four coding modules are used. The UE sequentially uses the four coding modules, that is, a coding module 1, a coding module 2, a coding module 3, and a coding module 4. Correspondingly, the network device also uses four decoding modules, that is, a decoding module 1, a decoding module 2, a decoding module 3, and a decoding module 4. The coding module 1 is corresponding to the decoding module 1, the coding module 2 is corresponding to the decoding module 2, the coding module 3 is corresponding to the decoding module 3, and the coding module 4 is corresponding to the decoding module 4.

Optionally, in this embodiment of the present application, the L coding modules used by the UE may not be completely corresponding to the Y decoding modules used by the network device. For example, it is assumed that L is 4, that is, a total of four coding modules are used, and the UE sequentially uses the four coding modules: a coding module 1, a coding module 2, a coding module 3, and a coding module 4. Correspondingly, Y is 1, that is, the network device uses one decoding module, which is a decoding module 1. When the coding modules perform coding in a sequence of the coding module 1, the coding module 2, the coding module 3, and the coding module 4, the corresponding decoding module repeatedly uses the decoding module 1 to perform decoding.

It should be noted that, the second coding module in Embodiment 1 and the second decoding module in Embodiment 2 may be corresponding modules, or may not be corresponding modules.

Optionally, in this embodiment of the present application, the network device may set a maximum quantity of PMIs received by the network device in one decoding period, and the network device may determine a quantity N of decoding modules based on the maximum quantity of PMIs reported by the UE. In addition, if the decoding module includes a neural network, a training process of the neural network may be performed based on the maximum quantity of PMIs received by the network device.

Optionally, in this embodiment of the present application, the first decoding module is obtained by decoding any PMI based on the decoding information of the second decoding module; the first decoding module is a decoding module corresponding to the any PMI; and the second decoding module is a decoding module before the first decoding module.

Optionally, in this embodiment of the present application, the decoding module may include a codebook or another decoding module that can perform decoding except the codebook. This is not limited in this embodiment of the present application.

In this way, the decoding module may be in another form other than a codebook. In a conventional technology, a codebook needs to be used for decoding. However, a codebook design needs to be based on a specific antenna model. That is, by using the codebook, a multi-antenna system that conforms to a specific antenna model needs to be used. A hardware device is not selected in a flexible manner. In this embodiment of the present application, channel transmission may be completed without using a codebook. Therefore, without being limited by a specific structure of the hardware device, it is more flexible to cooperate with various multi-antenna systems.

Optionally, in this embodiment of the present application, the decoding module may be a decoding module trained based on a neural network.

Optionally, the decoding information of the second decoding module includes at least one of: a third PMI corresponding to the second decoding module, intermediate state information for the second decoding module to decode the third PMI, time domain correlation information of the third PMI, or frequency domain correlation information of the third PMI.

For example, if the decoding module is obtained based on a neural network, the intermediate state information refers to an output of an intermediate layer of the neural network (passing through an activation function or not passing through an activation function). If the decoding module is a codebook, the intermediate state information refers to an intermediate result of processing such as transform of a two-dimensional discrete Fourier transform beam/matrix and a combination thereof. The foregoing processing includes operations such as a linear combination of a plurality of beams/matrices, a product, a kroneck product, eigenvalue decomposition, and a combination of these operations.

Optionally, in this embodiment of the present application, PMI bit widths of all or some of the Y decoding modules are the same, or PMI bit widths of the Y decoding modules are different.

Optionally, in this embodiment of the present application, step 301 may include the following step 301*a*.

Step 301*a*: After a first decoding period starts, the network device decodes, by using the Y decoding modules in the first decoding period, the N PMIs received from the UE to obtain the channel information of the N channels.

Optionally, step 301 may further include the following step 301*b*.

Step 301*b*: The network device performs, based on a first configuration parameter, PMI decoding by using a third decoding module to obtain the channel information.

The third decoding module is at least one of the Y decoding modules; and the first configuration parameter is used to indicate at least one of: the Y decoding modules, a decoding sequence of the Y decoding modules, a maximum decoding time of each decoding module, a maximum quantity of PMIs reported by the UE in one decoding period, a PMI bit width of the third decoding module, or a trigger condition for starting the first decoding period.

For example, the trigger condition for starting the first decoding period; and the trigger condition includes at least one of: a quantity of PMIs cumulatively reported by the UE in a second decoding period being greater than the maximum quantity M of PMIs received in one decoding period, the UE receiving first indication information from the network device, the UE sending second indication information to the network device, the network device continuously sending ACK to the UE a plurality of times, the network device detecting that a beam fails, the network device re-accessing or switching a cell, or a channel state being changed.

For example, the first indication information and the second indication information are used to indicate the network device to start a new decoding period, and the second decoding period is a previous decoding period of the first decoding period.

For example, the channel state being changed includes at least one of: a channel environment between the UE and the network device being changed, quality of service required by the network device being changed, the UE detecting that information of a used CSI-RS is changed, the network device detecting that information of a used CSI-RS is changed, or the UE detecting that an antenna state is changed.

It should be noted that, regarding that the network device detects that information of a used CSI-RS is changed, refer to the description in Embodiment 1, and details are not described herein again.

Optionally, the first configuration parameter is specified in a protocol, predefined, configuration information used by the UE in a second decoding period, or determined by the network device based on target information; where the second decoding period is a previous decoding period of the first decoding period; and the target information is used to indicate at least one of: a channel environment between the UE and the network device, quality of service required by the UE, hardware configuration of the network device, or hardware configuration of the UE.

In an example, the first configuration parameter may be reported by the UE to the network device by using signaling (for example, one or more of radio resource control (RRC), media access control-control element (MAC CE), and uplink control information (UCI)); or configured by the network device for the UE by using signaling (for example, one or more of RRC, a MAC CE, and downlink control information (DCI)).

In an example, the first configuration parameter may be a default configuration specified in a protocol.

In an example, the first configuration parameter is information used to indicate the Y decoding modules, information used to indicate a decoding sequence of decoding modules that perform decoding in the first decoding period, information used to indicate a maximum decoding time of a decoding module, information used to indicate a maximum quantity of PMIs received by the network device in one decoding period, information used to indicate a PMI bit width of a decoding module, and information used to indicate a trigger condition for starting the first decoding period. For example, the indication information in the first configuration parameter may be reported by the UE to the network device by using signaling (for example, one or more of RRC, a MAC CE, and UCI); or indicated by the network device to the UE by using signaling (for example, one or more of RRC, a MAC CE, and DCI).

It should be noted that for related descriptions and descriptions of the channel environment between the UE and the network device, refer to descriptions in Embodiment 1. Details are not described herein again. Similarly, for related descriptions and descriptions of the foregoing related information, refer to descriptions in Embodiment 1. Details are not described herein again.

Optionally, in this embodiment of the present application, before step 301b, step 301c is further included.

Step 301c: The network device obtains third indication information.

The third indication information is used to indicate the first configuration parameter.

For example, the third indication information is used to indicate a parameter identifier corresponding to the first configuration parameter. Example 1: After obtaining the first configuration parameter, the network device reports the third indication information to the UE, so that the network device may obtain the corresponding first configuration parameter from one or more preconfigured configuration parameters by using the parameter identifier of the first configuration parameter corresponding to the third indication information as an index. Example 2: The network device receives the third indication information from the UE, then obtains the parameter identifier of the first configuration parameter from the third indication information, and then obtains the corresponding first configuration parameter from one or more preconfigured configuration parameters by using the parameter identifier of the first configuration parameter as an index.

For example, the third indication information is used to indicate at least one of: a maximum decoding time of each decoding module, a maximum quantity of PMIs received by the network device in one decoding period, or a PMI bit width of the third decoding module.

For example, the third indication information is used to indicate a change amplitude of each parameter in the first configuration parameter.

It should be noted that, when the UE and the network device simultaneously obtain the third indication information, the network device indicates that the first configuration parameter takes precedence over the UE.

In this way, the network device can flexibly select a plurality of parameter change manners of the network device, and different change manners may be used for different cases. Therefore, resource overheads during decoding of the network device can be greatly reduced, and decoding efficiency can be improved.

Optionally, in this embodiment of the present application, step 301c may include the following step 301c1.

Step 301c1: The network device obtains the third indication information after a fourth decoding module completes decoding.

The fourth decoding module is a previous decoding module of the third decoding module, and the fourth decoding module is one of the Y decoding modules.

For example, the third indication information is further used to indicate to change at least one piece of the following information in an original configuration parameter of the third decoding module: a PMI bit width of the third decoding module, or a maximum quantity of PMIs received by the network device in one decoding period.

Optionally, in this embodiment of the present application, step 301c may include the following step 301c2.

Step 301c2: The network device obtains the third indication information before the first decoding period starts.

The first configuration parameter is a changed original configuration parameter of the third decoding module.

For example, the third indication information is further used to indicate to change at least one of the following original configuration parameter of the third decoding module: information used to indicate the Y decoding modules, information used to indicate a decoding sequence of decoding modules that perform decoding in the first decoding period, a maximum decoding time of the third decoding module, a maximum quantity of PMIs reported by the UE in one decoding period, a PMI bit width of the third decoding module, or a trigger condition for starting the first decoding period; where the first configuration parameter is a changed original configuration parameter of the third decoding module.

According to the decoding method provided in this embodiment of the present application, the network device decodes, by using the Y decoding modules, the N PMIs received from the UE to obtain the channel information of the N channels, and each decoding module corresponds to at least one PMI. Because some or all of the Y decoding modules are different, the network device may flexibly select a suitable decoding module based on a current application scenario to decode the PMI. Compared with a conventional PMI decoding process in which a fixed decoding module is used to decode the PMI, resource overheads of the network device are reduced, and communication efficiency is improved.

Embodiment 3

Figure 4:
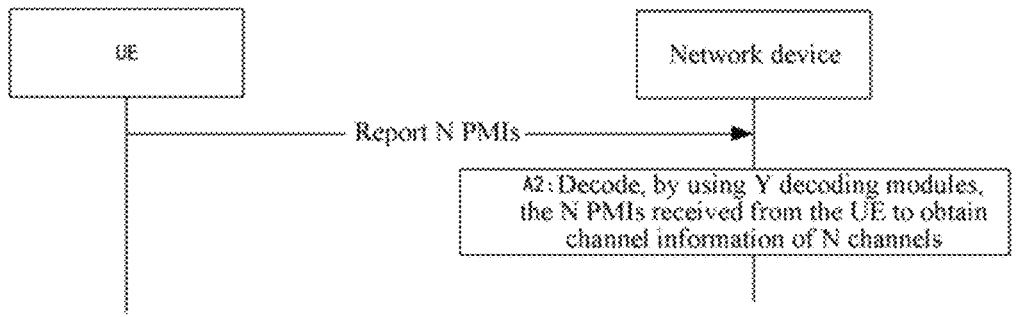
FIG. 4 is a second schematic flowchart of a decoding method according to an embodiment of the present application.

FIG. 4 is a schematic flowchart of a decoding method according to an embodiment of the present application. As shown in FIG. 4, the decoding method is applied to a network device, and the decoding method may include step A2.

Step A2: The network device decodes, by using Y decoding modules, the N PMIs received from the UE to obtain the channel information of the N channels.

In this embodiment of the present application, any one of the Y decoding modules corresponds to at least one of the N PMIs. Y is a positive integer greater than 1. Some or all of the Y decoding modules are different.

It should be noted that, for related descriptions and related descriptions of the decoding module and the decoding method in this embodiment, refer to descriptions of the decoding module in Embodiment 2 (that is, all content after step A1 in Embodiment 2). Details are not described herein again.

According to the decoding method provided in this embodiment of the present application, the network device decodes, by using the Y decoding modules, the N PMIs received from the UE to obtain the channel information of the N channels, and each decoding module corresponds to at least one PMI. Because some or all of the Y decoding modules are different, the network device may flexibly select a suitable decoding module based on a current application scenario to decode the PMI. Compared with a conventional PMI decoding process in which a fixed decoding module is used to decode the PMI, resource overheads of the network device are reduced, and communication efficiency is improved.

Embodiment 4

Currently, there is corresponding study of artificial intelligence (AI) and CSI in academia. Both a network device and a UE use matching neural networks. After receiving a CSI-RS, the UE performs channel estimation on the CSI-RS. Then, an estimated result is used as an input to the neural network on the UE side. An output of the neural network is a PMI. After receiving the PMI, the network device uses the PMI as an input to the neural network on the network device side. The output of the neural network is channel information of recovered information, so as to obtain CSI on the network device side. The neural network has a simple feedforward network, and neural networks at different moments are not associated with each other. There is also a long short term memory (LSTM) network, and the neural network uses intermediate information at a previous moment, but the neural network at each moment shares a same coefficient.

In this embodiment of the present application, the neural network may include a special neuron such as a convolutional neuron, and an activation function may be Sigmoid, a rectified linear unit (ReLU), a leaky rectified linear unit (leaky ReLU), a hyperbolic tangent function (tanh), or the like. This is not limited in this embodiment of the present application.

However, when channel information is transmitted in the foregoing transmission manner, the following defects exist: 1. An existing AI and CSI technology does not have an operation solution that considers impact of a protocol, such as a procedure of CSI measurement and reporting, and a training procedure of a neural network. 2. A set of parameters is shared by a network at each moment of a long short term memory (LSTM) network, this is not flexible enough, and performance improvement is limited.

To resolve this problem, an embodiment of the present application provides a training method for a coding module and a decoding module.

Figure 5:
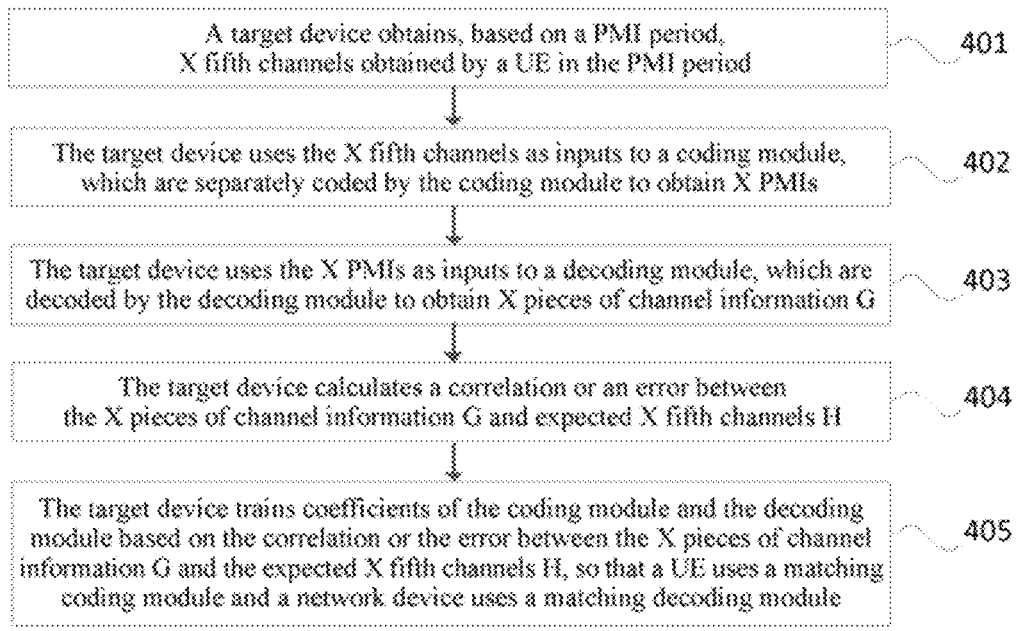
FIG. 5 is a schematic flowchart of a training method for a coding module and a decoding module according to an embodiment of the present application.

For a pair of coding module and decoding module, as shown in FIG. 5, a training method for the coding module and the decoding module may include step 401 to step 405.

Step 401: A target device obtains, based on a PMI period, X fifth channels obtained by a UE in the PMI period.

The PMI period includes total duration in which a coding module completes one time of coding and a corresponding decoding module completes one time of decoding. The X fifth channels are channels obtained after the UE performs channel estimation on a CSI-RS received in the PMI period.

Step 402: The target device uses the X fifth channels as inputs to a coding module, which are separately coded by the coding module to obtain X PMIs.

For example, any PMI in the X PMIs is obtained by a current coding module by coding, based on coding information of a previous coding module, a fifth channel corresponding to the any PMI; and the current coding module is a coding module corresponding to the any PMI, and X is a positive integer greater than 1.

Step 403: The target device uses the X PMIs as inputs to a decoding module, which are decoded by the decoding module to obtain X pieces of channel information G.

For example, any PMI in the X PMIs is obtained by a current decoding module by decoding, based on decoding information of a previous decoding module, a fifth channel corresponding to the any PMI; and the current decoding module is a decoding module corresponding to the any PMI, and X is a positive integer greater than 1.

Step 404: The target device calculates a correlation or an error between the X pieces of channel information G and expected X fifth channels H.

For example, step 404 may further be implemented by using the following steps 404a and 404b.

Step 404a: The target device performs calculation by using a single resource element (RE) and a correlation result in a single PMI period, to obtain a first calculation result.

The first calculation result includes at least one of: a correlation between G and H, a mean square error (MSE) between G and H, mutual information between G and H, a European distance between G and H, another response correlation or an error parameter.

Step 404b: The target device integrates different REs and the correlation result in the PMI period to obtain a second calculation result.

For example, the second calculation result may be combined in at least one of: arithmetic averaging, geometric averaging, harmonic averaging, square averaging, weighted averaging, minimum maximization, or maximum minimization. A calculation object may be all or some of the different REs and the correlation result in the PMI period.

Step 405: The target device trains coefficients of the coding module and the decoding module based on the correlation or the error between the X pieces of channel information G and the expected X fifth channels H, so that a UE uses a matching coding module and a network device uses a matching decoding module.

It should be noted that, the foregoing training process may be performed before a terminal device accesses a network, and a module coefficient is directly written into a chip. Alternatively, after the UE accesses the network, real-time training may be performed in synchronization with the network. When the terminal device performs real-time training with the network, when reporting the PMI by using the network, the terminal device reports complete information of the fifth channel H to the network. After X PMI periods, the network trains parameters of the decoding module based on the correlation or the error between the X pieces of channel information G and the expected X fifth channels H, and sends training-related information that is sent by the decoding module to the coding module to the terminal device, so that the terminal device trains parameters of the coding module.

According to the training method for the coding module and the decoding module provided in this embodiment of the present application, neural network training is performed on the coding module and the decoding module, to obtain the correlation and the error between G and expected H, and a training procedure based on a neural network is provided when protocol impact is considered. In addition, LSTM networks at different moments may flexibly configure the coding module, the decoding module, and related parameters thereof based on a change of a current scenario, thereby greatly improving running performance of AI and CSI, improving network CSI restoration precision, reducing resource overheads of the terminal and the network, and improving communication efficiency.

Embodiment 5

The following describes, by using an example, a coding and decoding method provided in an embodiment of the present application.

Figure 6:
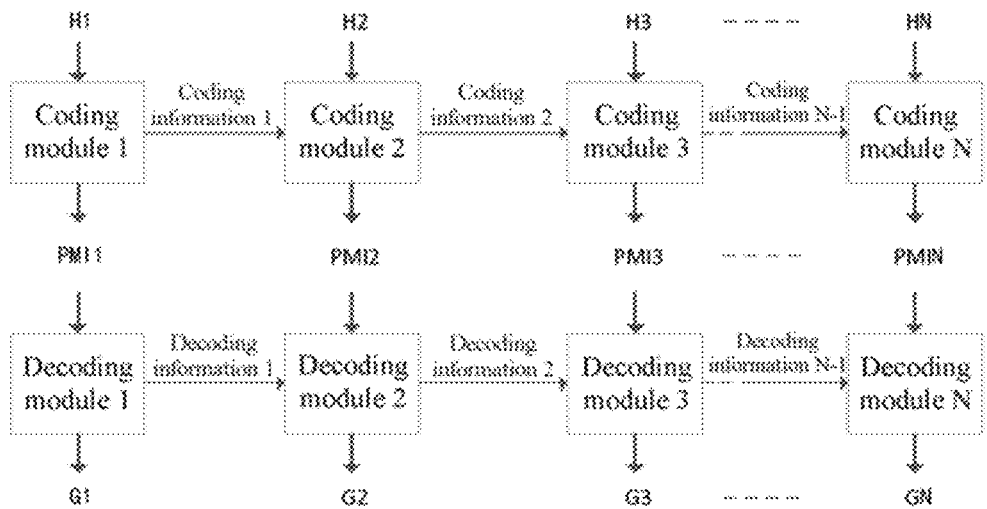
FIG. 6 is a schematic flowchart of a coding and decoding method according to an embodiment of the present application.

For example, as shown in a schematic diagram of a coding and decoding method shown in FIG. 6, L coding modules include a coding module 1 to a coding module N, N channels include H1 to HN, channel information of the N channels includes G1 to GN, and N PMIs include PMI1 to PMIN.

It should be noted that, structures and/or parameters of the L coding modules may be the same or different. Structures and/or parameters in Y decoding modules are at least different from those of other decoding modules. In addition, the L coding modules used by the UE and the Y decoding modules used by the network device may correspond to each other, that is, the H and the PMI corresponding to each coding module correspond to a sequence number of the G obtained by the corresponding decoding module. For example, H1 and PMI1 corresponding to the coding module 1 correspond to G1 obtained by a decoding module 1, and H2 and PMI2 corresponding to the coding module 2 correspond to G2 obtained by a decoding module 2 by decoding PMI2.

For example, with reference to the foregoing content, the coding and decoding method includes the following process:

(1) In the first PMI reporting event, the UE performs channel estimation on a current CSI-RS to obtain a channel H1, and inputs the channel H1 into the coding module 1 for coding to obtain PMI1. Then, the UE reports PMI1 to the network device, and the network device inputs PMI1 into the decoding module 1 for decoding to obtain channel information G1.

(2) In the second PMI reporting event, the UE performs channel estimation on a current CSI-RS to obtain a channel H2, and inputs the channel H2 and coding information 1 of the coding module 1 into the coding module 1 for coding to obtain PMI2. In this case, the obtained PMI2 includes mixed information of H1 and H2. Then, the UE reports PMI2 to the network device, and the network device inputs PMI1 and decoding information 1 of the decoding module 1 to the decoding module 1 for decoding to obtain channel information G2.

(3) For a coding and decoding process in the N−2 PMI reporting events after the second PMI reporting event, refer to the reporting process of the second PMI reporting event. Details are not described herein again.

For example, in the Nth PMI reporting event, an input to the coding module N includes not only HN but also coding information of at least one coding module in the coding module 1 to the coding module N−1. In this case, obtained PMIN includes mixed information of a plurality of channels. After the decoding module of the network device receives PMIN, when the decoding module performs decoding, the decoding module not only includes the received PMIN, but also includes decoding information of at least one decoding module in the decoding module 1 to a decoding module N−1. In this case, obtained GN includes mixed information of a plurality of PMIs.

It should be noted that, the coding information of the coding module may be not only that of a previous coding module, but also coding information of all or some of the foregoing coding modules. Correspondingly, the decoding information of the decoding module may be not only decoding information of the previous decoding module, but also decoding information of all or some of the foregoing decoding modules.

For example, before the coding module and the decoding module start to perform CSI transmission, the coding module and the decoding module are first trained. For example, during neural network training, H1 to HN are sequentially input into the coding module 1 to the coding module N based on the coding and decoding procedure shown in FIG. 6, to obtain PMI1 to PMIN. PMI1 to the PMIN are sequentially input into the decoding module 1 to the decoding module N to obtain G1 to GN. Then, the correlation and/or the error between G and H is calculated.

For example, a loss function of neural network training is shown as follows: Loss=1−(the mean of the squares of the correlations between H0 and G0, H1 and G1, . . . , HN and GN), and the correlation between G and H is calculated based on the foregoing calculation formula. Then, based on the correlation between G and H, parameters of the coding module and the decoding module may be trained and optimized, so that a loss gradually decreases.

Embodiment 6

Figure 7:
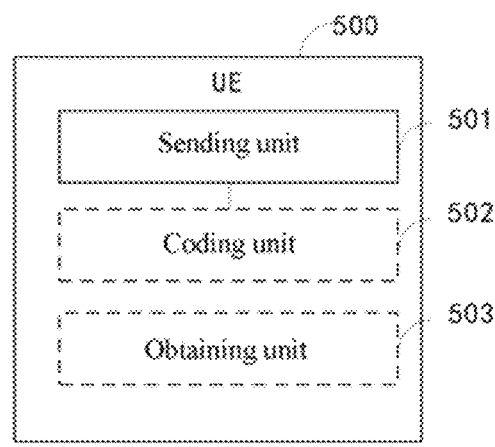
FIG. 7 is a schematic structural diagram of UE according to an embodiment of the present application.

FIG. 7 is a possible schematic structural diagram of a UE according to an embodiment of the present application. As shown in FIG. 7, the UE 500 includes a sending unit 501, where the sending unit 501 is configured to report N PMIs to a network device. Each PMI is corresponding to one channel; a first PMI includes channel information of a channel corresponding to a second PMI; the first PMI is one of the N PMIs; and the second PMI is at least one PMI before the first PMI, where N is a positive integer greater than 1.

Optionally, the N PMIs are corresponding to L coding modules, and any coding module obtains at least one PMI of the N PMIs; coding of a first coding module is based on coding information of a second coding module; the first coding module is one of the L coding modules; and the second coding module is a coding module that performs coding before the first coding module, and L is a positive integer greater than 1.

Optionally, the coding information of the second coding module includes at least one of: a CSI-RS corresponding to a first channel, intermediate state information for the second coding module to calculate a PMI, time domain correlation information of the CSI-RS, or frequency domain correlation information of the CSI-RS; where the first channel is a channel corresponding to a PMI corresponding to the second coding module.

Optionally, some or all of the L coding modules are different.

Optionally, PMI bit widths of all or some of the L coding modules are the same, or PMI bit widths of the L coding modules are different.

Optionally, the sending unit 501 is configured to report the N PMIs to the network device after a first coding period starts, where the N PMIs are obtained in the first coding period.

Optionally, as shown in FIG. 7, the UE 500 further includes a coding unit 502, where the coding unit 502 is configured to perform, based on a first configuration parameter, channel coding by using a third coding module to obtain a PMI; where the third coding module is at least one of the L coding modules; and the first configuration parameter is used to indicate at least one of: the L coding modules, a coding sequence of the L coding modules, a maximum coding time of each coding module, a maximum quantity M of PMIs reported by the UE in one coding period, a PMI bit width of the third coding module, or a trigger condition for starting the first coding period.

Optionally, the trigger condition for starting the first coding period; and the trigger condition includes at least one of: a quantity of PMIs cumulatively reported by the UE in a second coding period being greater than the quantity M, the UE receiving first indication information from the network device, the UE sending second indication information to the network device, the UE continuously receiving ACK a plurality of times from the network device, the UE detecting that a beam fails, the UE re-accessing or switching a cell, or a channel state being changed; where the first indication information and the second indication information are used to indicate the UE to start a new coding period, and the second coding period is a previous coding period of the first coding period.

Optionally, the channel state being changed includes at least one of: a channel environment between the UE and the network device being changed, quality of service required by the UE being changed, the UE detecting that information of a used CSI-RS is changed, the network device detecting that information of a used CSI-RS is changed, or the UE detecting that an antenna state is changed.

Optionally, the first configuration parameter is specified in a protocol, predefined, configuration information used by the UE in a second coding period, or determined by the UE based on target information; where the second coding period is a previous coding period of the first coding period; and the target information is used to indicate at least one of: a channel environment between the UE and the network device, quality of service required by the UE, hardware configuration of the network device, or hardware configuration of the UE.

Optionally, as shown in FIG. 7, the UE 500 further includes an obtaining unit 503, where the obtaining unit 503 is configured to obtain third indication information; where the third indication information is used to indicate the first configuration parameter.

Optionally, the obtaining unit 503 is configured to obtain the third indication information after a fourth coding module completes coding; where the fourth coding module is a previous coding module of the third coding module, and the fourth coding module is one of the L coding modules.

Optionally, the third indication information is further used to indicate to change at least one piece of the following information in an original configuration parameter of the third coding module: a PMI bit width of the third coding module, or a maximum quantity of PMIs reported by the UE in one coding period.

Optionally, the obtaining unit 503 is configured to obtain the third indication information before the first coding period starts; where the first configuration parameter is a changed original configuration parameter.

Optionally, the third indication information is further used to indicate to change at least one of the following original configuration parameter of the third coding module: information used to indicate the L coding modules, information used to indicate a coding sequence of coding modules that perform coding in the first coding period, a maximum coding time of the third coding module, a maximum quantity of PMIs reported by the UE in one coding period, a PMI bit width of the third coding module, or a trigger condition for starting the first coding period; where the first configuration parameter is a changed original configuration parameter.

Optionally, the channel environment between the UE and the network device is obtained by the UE by detecting a second channel, or obtained by the network device by detecting a third channel, or obtained by a sensing device of the UE, or obtained by the network device through a CSI report sent by the UE; and/or the target information is obtained by the UE through higher layer signaling; where the second channel includes at least one of: a PDCCH, a PDSCH, a CSI-RS, a DMRS, a PTRS, a synchronization signal, or a PBCH; and the third channel includes at least one of: a PUCCH, a PUSCH, a PRACH, an SRS, a PTRS, or a DMRS.

Optionally, the target information includes first information, and the first information is used to indicate the channel environment between the UE and the network device; where the first information includes at least one of: transmission power, noise power, interference power, LOS, NLOS, time delay information, a scattering condition, channel time variation, a terminal moving speed, a terminal rotating speed, or a change speed of a shielding around a terminal; and/or the target information includes second information, and the second information is used to indicate the quality of service required by the UE; and the second information includes at least one of: an electric quantity, a throughput value, time delay information, a size of a data packet that needs to be transmitted, a bit error rate, a signal-to-noise ratio, or a signal to interference plus noise ratio; and/or the target information includes third information, and the third information is used to indicate the hardware configuration of the network device; and the third information includes at least one of: an antenna-related parameter of the network device or a processing capability information parameter of the network device; and/or the target information includes fourth information, and the fourth information is used to indicate the hardware configuration of the UE; and the fourth information includes at least one of: an antenna-related parameter of the UE or a processing capability information parameter of the UE;

where the antenna-related parameter of the network device includes at least one of: a quantity of antenna elements, a quantity of TXRUs, or a quantity of antenna panels; the processing capability information parameter of the network device includes at least one of: a signal processing capability, a data calculation capability, a storage capability, a CPU, a GPU, or an NPU; the antenna-related parameter of the UE includes at least one of: a quantity of antenna elements, a quantity of TXRUs, or a quantity of antenna panels; and the processing capability information parameter of the UE includes at least one of: a signal processing capability, a data calculation capability, a storage capability, a CPU, a GPU, or an NPU.

According to the UE provided in this embodiment of the present application, after the UE codes a channel, an obtained PMI includes channel information of at least one PMI before the PMI. That is, compared with a conventional technology that only channel information and a fixed codebook are used to code the channel, in the embodiments of the present application, when the channel is coded, channel information of another channel that is previously coded by the UE is combined for coding, thereby improving coding accuracy of the UE, obtaining a PMI with a higher precision, obtaining precise CSI, and improving communication efficiency.

It should be noted that, as shown in FIG. 7, a module necessarily included in the UE 500 is shown in a solid-line box, such as the sending unit 501; and modules that may or may not be included in the UE 500 are indicated by a dashed-line box, for example, the obtaining unit 503.

The UE 500 provided in this embodiment of the present application can implement the process shown in the foregoing method embodiment. To avoid repetition, details are not described herein again.

Embodiment 7

Figure 8:
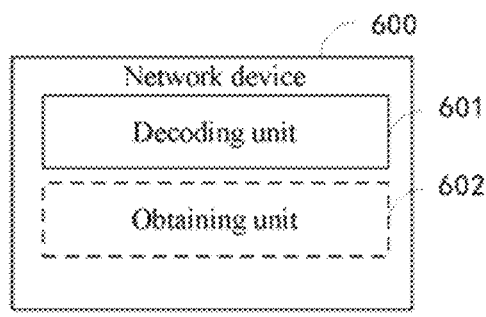
FIG. 8 is a schematic structural diagram of a network device according to an embodiment of the present application.

FIG. 8 is a possible schematic structural diagram of a network device according to an embodiment of the present application. As shown in FIG. 8, the network device 600 includes a decoding unit 601, where the decoding unit 601 is configured to decode N PMIs received from a UE to obtain channel information of N channels. Each PMI is corresponding to channel information of one channel; a first PMI includes channel information of a channel corresponding to a second PMI; the first PMI is one of the N PMIs; and the second PMI is at least one PMI before the first PMI, and N is a positive integer greater than 1.

Optionally, the decoding unit 601 is configured to decode, by using Y decoding modules, the N PMIs received from the UE to obtain the channel information of the N channels. Any decoding module is corresponding to at least one of the N PMIs; and Y is a positive integer greater than 1.

Optionally, some or all of the Y decoding modules are different.

Optionally, decoding of a first decoding module is based on decoding information of a second decoding module and/or coding information of a second coding module; the first decoding module is one of the Y decoding modules; the second decoding module is a decoding module before the first decoding module; and the second coding module is a coding module that performs coding before a coding module corresponding to the first decoding module.

Optionally, the decoding information of the second decoding module includes at least one of: a third PMI corresponding to the second decoding module, intermediate state information for the second decoding module to decode the third PMI, time domain correlation information of the third PMI, or frequency domain correlation information of the third PMI.

Optionally, PMI bit widths of all or some of the Y decoding modules are the same, or PMI bit widths of the Y decoding modules are different.

Optionally, the decoding unit 601 is configured to: after a first decoding period starts, decode, by using the Y decoding modules in the first decoding period, the N PMIs received from the UE to obtain the channel information of the N channels.

Optionally, the decoding unit 601 is configured to perform, based on a first configuration parameter, PMI decoding by using a third decoding module to obtain the channel information; where the third decoding module is at least one of the Y decoding modules; and the first configuration parameter is used to indicate at least one of: the Y decoding modules, a decoding sequence of the Y decoding modules, a maximum decoding time of each decoding module, a maximum quantity of PMIs reported by the UE in one decoding period, a PMI bit width of the third decoding module, or a trigger condition for starting the first decoding period.

Optionally, the trigger condition for starting the first decoding period; and the trigger condition includes at least one of: a quantity of PMIs cumulatively reported by the UE in a second decoding period being greater than the quantity M, the UE receiving first indication information from the network device, the UE sending second indication information to the network device, the network device continuously sending acknowledgement (ACK) information to the UE a plurality of times, the network device detecting that a beam fails, the network device re-accessing or switching a cell, or a channel state being changed; where the first indication information and the second indication information are used to indicate the network device to start a new decoding period, and the second decoding period is a previous decoding period of the first decoding period.

Optionally, the channel state being changed includes at least one of: a channel environment between the UE and the network device being changed, quality of service required by the network device being changed, the UE detecting that information of a used CSI-RS is changed, the network device detecting that information of a used CSI-RS is changed, or the UE detecting that an antenna state is changed.

Optionally, the first configuration parameter is specified in a protocol, predefined, configuration information used by the UE in a second decoding period, or determined by the network device based on target information; where the second decoding period is a previous decoding period of the first decoding period; and the target information is used to indicate at least one of: a channel environment between the UE and the network device, quality of service required by the UE, hardware configuration of the network device, or hardware configuration of the UE.

Optionally, as shown in FIG. 8, the network device further includes an obtaining unit 602, where the obtaining unit 602 is configured to obtain third indication information. The third indication information is used to indicate the first configuration parameter.

Optionally, the obtaining unit 602 is configured to obtain the third indication information after a fourth decoding module completes decoding. The fourth decoding module is a previous decoding module of the third decoding module, and the fourth decoding module is one of the Y decoding modules.

Optionally, the third indication information is further used to indicate to change at least one piece of the following information in an original configuration parameter of the third decoding module: a PMI bit width of the third decoding module, or a maximum quantity of PMIs reported by the UE in one decoding period.

Optionally, the obtaining unit 602 is configured to obtain the third indication information before the first decoding period starts. The first configuration parameter is a changed original configuration parameter.

Optionally, the third indication information is further used to indicate to change at least one of the following original configuration parameter of the third decoding module: information used to indicate the Y decoding modules, information used to indicate a decoding sequence of decoding modules that perform decoding in the first decoding period, a maximum decoding time of the third decoding module, a maximum quantity of PMIs reported by the UE in one decoding period, a PMI bit width of the third decoding module, or a trigger condition for starting the first decoding period; where the first configuration parameter is a changed original configuration parameter.

Optionally, the channel environment between the UE and the network device is obtained by the UE by detecting a second channel, or obtained by the network device by detecting a third channel, or obtained by a sensing device of the UE, or obtained by the network device through a CSI report sent by the UE; and/or the target information is obtained by the UE through higher layer signaling; where the second channel includes at least one of: a physical downlink control channel (PDCCH), a physical downlink shared channel (PDSCH), a channel state information reference signal (CSI-RS), a demodulation reference signal (DMRS), a phase tracking reference signal (PTRS), a synchronization signal, or a physical broadcast channel (PBCH); and the third channel includes at least one of: a physical uplink control channel (PUCCH), a physical uplink shared channel (PUSCH), a physical random access channel (PRACH), a channel sounding reference signal (SRS), a PTRS, or a DMRS.

Optionally, the target information includes first information, and the first information is used to indicate the channel environment between the UE and the network device; where the first information includes at least one of: transmission power, noise power, interference power, LOS, NLOS, time delay information, a scattering condition, channel time variation, a terminal moving speed, a terminal rotating speed, or a change speed of a shielding around a terminal; and/or the target information includes second information, and the second information is used to indicate the quality of service required by the UE; and the second information includes at least one of: an electric quantity, a throughput value, time delay information, a size of a data packet that needs to be transmitted, a bit error rate, a signal-to-noise ratio, or a signal to interference plus noise ratio; and/or the target information includes third information, and the third information is used to indicate the hardware configuration of the network device; and the third information includes at least one of: an antenna-related parameter of the network device or a processing capability information parameter of the network device; and/or the target information includes fourth information, and the fourth information is used to indicate the hardware configuration of the UE; and the fourth information includes at least one of: an antenna-related parameter of the UE or a processing capability information parameter of the UE;

where the antenna-related parameter of the network device includes at least one of: a quantity of antenna elements, a quantity of transceiver units (TXRUs), or a quantity of antenna panels; the processing capability information parameter of the network device includes at least one of: a signal processing capability, a data calculation capability, a storage capability, a central processing unit (CPU), a graphics processing unit (GPU), or a neural network processing unit (NPU); the antenna-related parameter of the UE includes at least one of: a quantity of antenna elements, a quantity of TXRUs, or a quantity of antenna panels; and the processing capability information parameter of the UE includes at least one of: a signal processing capability, a data calculation capability, a storage capability, a CPU, a GPU, or an NPU.

According to the network device provided in this embodiment of the present application, compared with a conventional technology in which a channel is decoded by only using channel information and a fixed codebook, in this embodiment of the present application, when the PMI is decoded, any PMI in the N PMIs received by the network device includes channel information of at least one PMI before the any PMI, so that the network device can obtain more accurate CSI, thereby improving communication efficiency.

It should be noted that, as shown in FIG. 8, a module necessarily included in the network device 600 is shown in a solid-line box, such as the decoding unit 601; and a module that may or may not be included in the network device 600 is indicated by a dashed-line box, for example, the obtaining unit 602.

The network device provided in this embodiment of the present application can implement the process shown in the foregoing method embodiment. To avoid repetition, details are not described herein again.

Embodiment 8

FIG. 8 is a possible schematic structural diagram of a network device according to an embodiment of the present application. As shown in FIG. 8, the network device 600 includes a decoding unit 601, where the decoding unit 601 is configured to decode, by using Y decoding modules, N PMIs received from a UE to obtain channel information of N channels. Any decoding module is corresponding to at least one of the N PMIs; and some or all of the Y decoding modules are different; and Y is a positive integer greater than 1.

Optionally, decoding of a first decoding module is based on decoding information of a second decoding module and/or coding information of a second coding module; the first decoding module is one of the Y decoding modules; the second decoding module is a decoding module before the first decoding module; and the second coding module is a coding module that performs coding before a coding module corresponding to the first decoding module.

Optionally, the decoding information of the second decoding module includes at least one of: a third PMI corresponding to the second decoding module, intermediate state information for the second decoding module to decode the third PMI, time domain correlation information of the third PMI, or frequency domain correlation information of the third PMI.

Optionally, PMI bit widths of all or some of the Y decoding modules are the same, or PMI bit widths of the Y decoding modules are different.

Optionally, the decoding unit 601 is configured to: after a first decoding period starts, decode, by using the Y decoding modules in the first decoding period, the N PMIs received from the UE to obtain the channel information of the N channels.

Optionally, the decoding unit 601 is configured to perform, based on a first configuration parameter, PMI decoding by using a third decoding module to obtain the channel information; where the third decoding module is at least one of the Y decoding modules; and the first configuration parameter is used to indicate at least one of: the Y decoding modules, a decoding sequence of the Y decoding modules, a maximum decoding time of each decoding module, a maximum quantity of PMIs reported by the UE in one decoding period, a PMI bit width of the third decoding module, or a trigger condition for starting the first decoding period.

Optionally, the trigger condition for starting the first decoding period; and the trigger condition includes at least one of: a quantity of PMIs cumulatively reported by the UE in a second decoding period being greater than the quantity M, the UE receiving first indication information from the network device, the UE sending second indication information to the network device, the network device continuously sending acknowledgement (ACK) information to the UE a plurality of times, the network device detecting that a beam fails, the network device re-accessing or switching a cell, or a channel state being changed; where the first indication information and the second indication information are used to indicate the network device to start a new decoding period, and the second decoding period is a previous decoding period of the first decoding period.

Optionally, the channel state being changed includes at least one of: a channel environment between the UE and the network device being changed, quality of service required by the network device being changed, the UE detecting that information of a used CSI-RS is changed, the network device detecting that information of a used CSI-RS is changed, or the UE detecting that an antenna state is changed.

Optionally, the first configuration parameter is specified in a protocol, predefined, configuration information used by the UE in a second decoding period, or determined by the network device based on target information; where the second decoding period is a previous decoding period of the first decoding period; and the target information is used to indicate at least one of: a channel environment between the UE and the network device, quality of service required by the UE, hardware configuration of the network device, or hardware configuration of the UE.

Optionally, as shown in FIG. 8, the network device further includes an obtaining unit 602, where the obtaining unit 602 is configured to obtain third indication information. The third indication information is used to indicate the first configuration parameter.

Optionally, the obtaining unit 602 is configured to obtain the third indication information after a fourth decoding module completes decoding. The fourth decoding module is a previous decoding module of the third decoding module, and the fourth decoding module is one of the Y decoding modules.

Optionally, the third indication information is further used to indicate to change at least one piece of the following information in an original configuration parameter of the third decoding module: a PMI bit width of the third decoding module, or a maximum quantity of PMIs reported by the UE in one decoding period.

Optionally, the obtaining unit 602 is configured to obtain the third indication information before the first decoding period starts. The first configuration parameter is a changed original configuration parameter.

Optionally, the third indication information is further used to indicate to change at least one of the following original configuration parameter of the third decoding module: information used to indicate the Y decoding modules, information used to indicate a decoding sequence of decoding modules that perform decoding in the first decoding period, a maximum decoding time of the third decoding module, a maximum quantity of PMIs reported by the UE in one decoding period, a PMI bit width of the third decoding module, or a trigger condition for starting the first decoding period; where the first configuration parameter is a changed original configuration parameter.

Optionally, the channel environment between the UE and the network device is obtained by the UE by detecting a second channel, or obtained by the network device by detecting a third channel, or obtained by a sensing device of the UE, or obtained by the network device through a CSI report sent by the UE; and/or the target information is obtained by the UE through higher layer signaling; where the second channel includes at least one of: a physical downlink control channel (PDCCH), a physical downlink shared channel (PDSCH), a channel state information reference signal (CSI-RS), a demodulation reference signal (DMRS), a phase tracking reference signal (PTRS), a synchronization signal, or a physical broadcast channel (PBCH); and the third channel includes at least one of: a physical uplink control channel (PUCCH), a physical uplink shared channel (PUSCH), a physical random access channel (PRACH), a channel sounding reference signal (SRS), a PTRS, or a DMRS.

Optionally, the target information includes first information, and the first information is used to indicate the channel environment between the UE and the network device; where the first information includes at least one of: transmission power, noise power, interference power, LOS, NLOS, time delay information, a scattering condition, channel time variation, a terminal moving speed, a terminal rotating speed, or a change speed of a shielding around a terminal; and/or the target information includes second information, and the second information is used to indicate the quality of service required by the UE; and the second information includes at least one of: an electric quantity, a throughput value, time delay information, a size of a data packet that needs to be transmitted, a bit error rate, a signal-to-noise ratio, or a signal to interference plus noise ratio; and/or the target information includes third information, and the third information is used to indicate the hardware configuration of the network device; and the third information includes at least one of: an antenna-related parameter of the network device or a processing capability information parameter of the network device; and/or the target information includes fourth information, and the fourth information is used to indicate the hardware configuration of the UE; and the fourth information includes at least one of: an antenna-related parameter of the UE or a processing capability information parameter of the UE;

where the antenna-related parameter of the network device includes at least one of: a quantity of antenna elements, a quantity of transceiver units (TXRUs), or a quantity of antenna panels; the processing capability information parameter of the network device includes at least one of: a signal processing capability, a data calculation capability, a storage capability, a central processing unit (CPU), a graphics processing unit (GPU), or a neural network processing unit (NPU); the antenna-related parameter of the UE includes at least one of: a quantity of antenna elements, a quantity of TXRUs, or a quantity of antenna panels; and the processing capability information parameter of the UE includes at least one of: a signal processing capability, a data calculation capability, a storage capability, a CPU, a GPU, or an NPU.

According to the network device provided in this embodiment of the present application, the network device decodes, by using the Y decoding modules, the N PMIs received from the UE to obtain the channel information of the N channels, and each decoding module corresponds to at least one PMI. Because some or all of the Y decoding modules are different, the network device may flexibly select a suitable decoding module based on a current application scenario to decode the PMI. Compared with a conventional PMI decoding process in which a fixed decoding module is used to decode the PMI, resource overheads of the network device are reduced, and communication efficiency is improved.

It should be noted that, as shown in FIG. 8, a module necessarily included in the network device 600 is shown in a solid-line box, such as the decoding unit 601; and a module that may or may not be included in the network device 600 is indicated by a dashed-line box, for example, the obtaining unit 602.

The network device provided in this embodiment of the present application can implement the process shown in the foregoing method embodiment. To avoid repetition, details are not described herein again.

Embodiment 9

Figure 9:
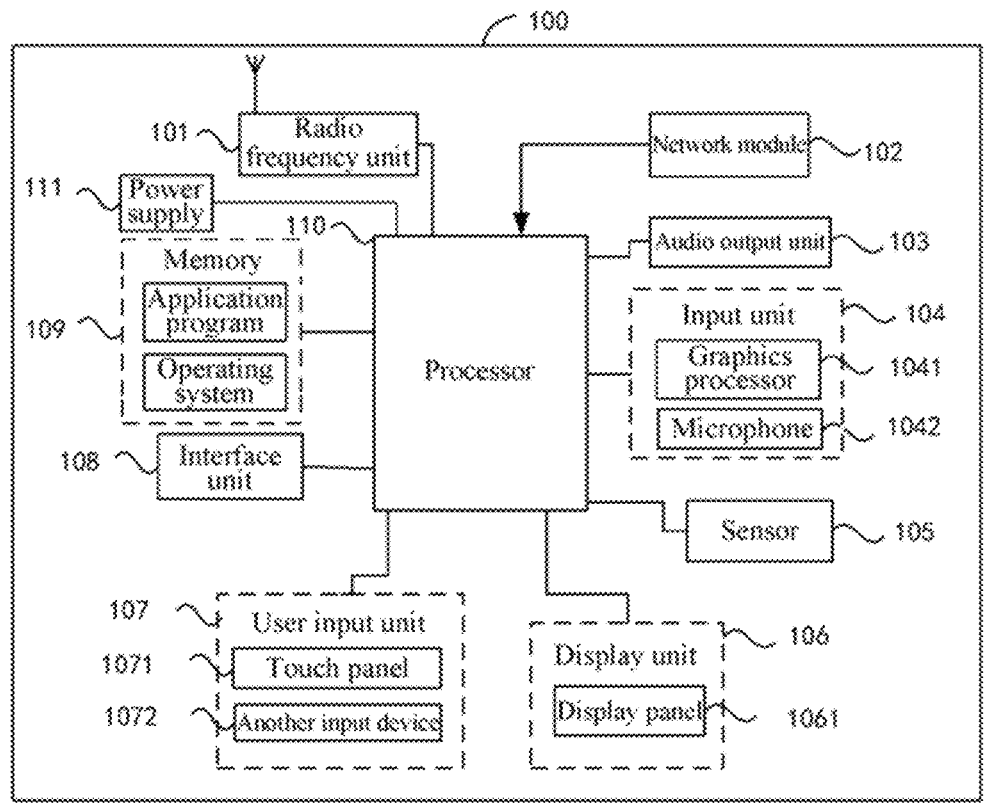
FIG. 9 is a schematic structural diagram of hardware of a terminal device according to an embodiment of the present application.

Using the UE as a terminal device as an example. FIG. 9 is a schematic diagram of a hardware structure of a terminal device for implementing various embodiments of the present application. The terminal 100 includes but is not limited to: components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal device 100 shown in FIG. 9 is not intended to limit the terminal device, and the terminal device 100 may include more components or fewer components than those shown in the figure, or some components may be combined, or a different component deployment may be used. In the embodiments of the present application, the terminal device 100 includes but is not limited to a mobile phone, a tablet computer, a notebook computer, a handheld computer, an in-vehicle terminal device, a wearable device, and a pedometer.

The radio frequency unit 101 is configured to report N PMIs to a network device. Each PMI is corresponding to one channel; a first PMI includes channel information of a channel corresponding to a second PMI; the first PMI is one of the N PMIs; and the second PMI is at least one PMI before the first PMI, where N is a positive integer greater than 1.

According to the terminal device provided in this embodiment of the present application, after the terminal device codes a channel, an obtained PMI includes channel information of at least one PMI before the PMI. That is, compared with a conventional technology that only channel information and a fixed codebook are used to code the channel, in the embodiments of the present application, when the channel is coded, channel information of another channel that is previously coded by the terminal device is combined for coding, thereby improving coding accuracy of the terminal device, obtaining a PMI with a higher precision, obtaining precise CSI, and improving communication efficiency.

It should be understood that in this embodiment of the present application, the radio frequency unit 101 may be configured to receive and transmit information or receive and transmit a signal during a call, for example, receive downlink data from a base station and send the downlink data to the processor 110 for processing; In addition, the RF circuit transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency circuit 102 may further communicate with another device through wireless communication. In addition, the radio frequency unit 101 may further communicate with the network and another device through wireless communication system.

The terminal device 100 provides the user with wireless broadband Internet access through a network module 102, such as helping the user to send and receive emails, browse web pages, and access streaming media.

An audio output unit 103 may convert audio data received by the radio frequency unit 101 or the network module 102 or stored in a memory 109 into an audio signal and output as sound. In addition, the audio output unit 103 may further provide an audio output that is related to a particular function executed by the terminal device 100 (for example, a call signal receiving sound or a message receiving sound). The audio output unit 103 includes a loudspeaker, a buzzer, a receiver, and the like.

An input unit 104 is configured to receive an audio signal or a video signal. The input unit 104 may include a graphics processing unit (GPU) 1041 and a microphone 1042. The graphics processing unit 1041 performs processing on image data of a static picture or a video that is obtained by an image acquisition device (for example, a camera) in a video acquisition mode or an image acquisition mode. An image frame that has been processed may be displayed on a display unit 106. An image frame that has been processed by the graphics processing unit 1041 may be stored in the memory 109 (or another storage medium) or sent by using the radio frequency unit 101 or the network module 102. The microphone 1042 can receive sound and can process such sound into audio data. The processed audio data may be transferred, in a phone talk mode, to a format that may be sent to a mobile communication base station via the radio frequency unit 101 to output.

The terminal device 100 may further include at least one sensor 105, such as an optical sensor, a motion sensor, and other sensors. For example, the optical sensor includes an ambient light sensor and a proximity sensor. The ambient light sensor can adjust luminance of the display panel 1061 according to brightness of the ambient light. The proximity sensor may switch off the display panel 1061 and/or backlight when the terminal device 100 is moved to the ear. As a motion sensor, an accelerometer sensor may detect acceleration values in all directions (usually on three axes), may detect a value and a direction of gravity when the accelerometer sensor is stationary, and may be used to recognize a terminal device posture (for example, screen switching between landscape and portrait modes, a related game, and magnetometer posture calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

A display unit 106 is configured to display information input by the user or information provided for the user. The display unit 106 may include a display panel 1061. The display panel 1061 may be configured in the form of a liquid crystal display (LCD), an organic light-emitting diode (OLED), or the like.

A user input unit 107 may be configured to: receive input digit or character information, and generate a keyboard signal input related to a user setting and function control of the terminal device 100. For example, the user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment, such as a finger or a touch pen). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 110, receives and executes a command transmitted by the processor 110. In addition, the touch panel 1071 may be implemented by using various types, such as a resistive type, a capacitance type, an infrared type, and a surface acoustic wave type. In addition to the touch panel 1071, the user input unit 107 may further include the another input device 1072. For example, the another input device 1072 may include, but is not limited to, a physical keyboard, a functional key (such as a volume control key or a switch key), a track ball, a mouse, and a joystick, which are not repeated herein.

Optionally, the touch panel 1071 may cover the display panel 1061. After detecting a touch operation on or near the touch panel 1071, the touch panel 1071 transfers the touch operation to the processor 110, to determine a type of a touch event. Then, the processor 110 provides a corresponding visual output on the display panel 1061 according to the type of the touch event. In FIG. 9, the touch panel 1071 and the display panel 1061 implement, as two independent parts, input and output functions of the terminal device 100. However, in some embodiments, the touch panel 1071 and the display panel 1061 may be integrated to implement the input and output functions of the terminal device 100, which is not limited herein.

An interface unit 108 is an interface for connecting an external device to the terminal device 100. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 108 may be configured to receive an input (for example, data information or power) from an external apparatus, and transmit the received input to one or more elements in the terminal device 100, or may be configured to transmit data between the terminal device 100 and the external apparatus.

The memory 109 may be configured to store a software program and various data. The memory 109 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 109 may include a high speed random access memory, and may further include a non-volatile memory, such as at least one magnetic disk storage device, a flash memory device, or other non-volatile solid state storage devices.

The processor 110 is a control center of the terminal device 100, and is connected to various parts of the terminal device 100 by using various interfaces and lines. By running or executing the software program and/or the module stored in the memory 109, and invoking data stored in the memory 109, the processor 130 performs various functions and data processing of the terminal device 100, thereby performing overall monitoring on the terminal device 100. The processor 110 may include one or more processing units. Optionally, the processor 110 may integrate an application processor and a modem. The application processor mainly processes an operating system, a user interface, an application, and the like. The modem mainly processes wireless communication. It may be understood that the foregoing modem may either not be integrated into the processor 110.

The terminal device 100 further includes the power supply 111 (such as a battery) for supplying power to the components, optionally, the power supply 111 may be logically connected to the processor 110 by using a power management system, thereby implementing functions such as charging, discharging, and power consumption management by using the power management system.

In addition, the terminal device 100 includes some unshown functional modules, which is not repeated herein.

Embodiment 10

Figure 10:
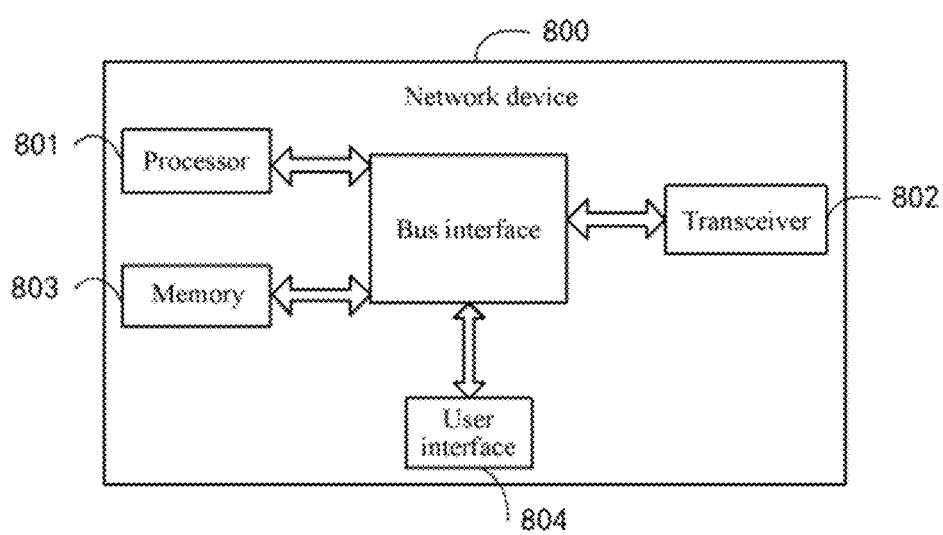
FIG. 10 is a schematic structural diagram of a hardware of a network device according to an embodiment of the present application.

FIG. 10 is a schematic structural diagram of hardware of a network device according to an embodiment of the present application. The network device 800 includes a processor 801, a transceiver 802, a memory 803, a user interface 804, and a bus interface.

The processor 801 is configured to decode N PMIs received from a UE to obtain channel information of N channels. Each PMI is corresponding to channel information of one channel; a first PMI includes channel information of a channel corresponding to a second PMI; the first PMI is one of the N PMIs; and the second PMI is at least one PMI before the first PMI, and N is a positive integer greater than 1.

According to the network device provided in this embodiment of the present application, compared with a conventional technology in which a channel is decoded by only using channel information and a fixed codebook, in this embodiment of the present application, when the PMI is decoded, any PMI in the N PMIs received by the network device includes channel information of at least one PMI before the any PMI, so that the network device can obtain more accurate CSI, thereby improving communication efficiency.

Alternatively, the processor 801 is configured to decode, by using Y decoding modules, N PMIs received from a UE to obtain channel information of N channels. Any decoding module is corresponding to at least one of the N PMIs; and some or all of the Y decoding modules are different; and Y is a positive integer greater than 1.

According to the network device provided in this embodiment of the present application, the network device decodes, by using the Y decoding modules, the N PMIs received from the UE to obtain the channel information of the N channels, and each decoding module corresponds to at least one PMI. Because some or all of the Y decoding modules are different, the network device may flexibly select a suitable decoding module based on a current application scenario to decode the PMI. Compared with a conventional PMI decoding process in which a fixed decoding module is used to decode the PMI, resource overheads of the network device are reduced, and communication efficiency is improved.

In the embodiment of the present application, in FIG. 10, a bus architecture may include any quantity of interconnected buses and bridges, and connects together circuits that are of one or more processors represented by the processor 801 and of a memory 803 represented by the memory. The bus architecture may further connect various other circuits of a peripheral device, a voltage regulator, a power management circuit, and the like. This is well known in the art, and therefore, no description is provided in this specification. The bus interface provides an interface. The transceiver 802 may be a plurality of components. The transceiver 802 includes a transmitter and a receiver, and provides a unit configured to communicate with various other apparatuses on a transmission medium. For different user equipments, a user interface 804 may be an interface that can externally or internally connect to a needed device, and the connected device includes but is not limited to a keypad, a display, a loudspeaker, a microphone, and a joystick. The processor 801 is responsible for the management of the bus architecture and normal processing, and the memory 803 may be configured to store data used when the processor 801 performs an operation.

In addition, the network device 800 further includes some unshown functional modules, which is not repeated herein.

Embodiment 11

Optionally, an embodiment of the present application further provides a terminal device, including a processor, a memory, and a computer program stored in the memory and executable on the processor. When the computer program is executed by the processor, the process of the coding method shown in the foregoing embodiment is implemented, and a same technical effect can be achieved. To avoid repetition, details are not described herein again.

Optionally, an embodiment of the present application further provides a network device, including a processor, a memory, and a computer program stored in the memory and executable on the processor. When the computer program is executed by the processor, the process of the decoding method shown in the foregoing embodiment is implemented, and a same technical effect can be achieved. To avoid repetition, details are not described herein again.

An embodiment of the present application further provides a non-transitory computer readable storage medium. A computer program is stored in the non-transitory computer readable storage medium. When the computer program is executed by a processor, a plurality of processes of the coding method and/or the decoding method in the foregoing embodiments are implemented, and a same technical effect can be achieved. To avoid repetition, details are not described herein again. The non-transitory computer-readable storage medium may include a flash drive, a read-only memory (ROM), a random access memory (RAM), a magnetic disk, or an optical disc.

It is to be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present application or the part that makes contributions to the related technology may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present application.

The embodiments of the present application are described above with reference to the accompanying drawings, but the present application is not limited to the foregoing embodiments, which are merely illustrative rather than limited. Under the inspiration of the present application, a person of ordinary skill in the art can make many forms without departing from the scope of the present application and the protection of the claims, all of which fall within the protection of the present application.

What is claimed is:

1. A coding method, performed by a user equipment (UE) and comprising:
reporting N precoding matrix indicators (PMIs) to a network device; wherein
each PMI is corresponding to one channel; a first PMI comprises channel information of a channel corresponding to a second PMI; the first PMI is one of the N PMIs; and the second PMI is at least one of the PMIs corresponding to channels before a channel corresponding to the first PMI, wherein N is a positive integer greater than 1;

wherein the N PMIs correspond to L coding modules, and any coding module of the L coding modules obtains at least one PMI of the N PMIs;

coding of a first coding module is based on coding information of a second coding module;

the first coding module is one of the L coding modules; and the second coding module is a coding module that performs coding before the first coding module, and L is a positive integer greater than 1.

2. The method according to claim 1, wherein the coding information of the second coding module comprises at least one of: a channel state information reference signal (CSI-RS) corresponding to a first channel, intermediate state information for the second coding module to calculate a PMI, time domain correlation information of the CSI-RS, or frequency domain correlation information of the CSI-RS; wherein the first channel is a channel corresponding to a PMI corresponding to the second coding module.

3. The method according to claim 1, wherein some or all of the L coding modules are different.

4. The method according to claim 3, wherein PMI bit widths of all or some of the L coding modules are same, or PMI bit widths of the L coding modules are different.

5. The method according to claim 1, wherein the reporting N PMIs to a network device comprises:

reporting the N PMIs to the network device after a first coding period starts, wherein the N PMIs are obtained in the first coding period.

6. The method according to claim 5, wherein the method further comprises:

performing, based on a first configuration parameter, channel coding by using a third coding module to obtain a PMI; wherein the third coding module is at least one of the L coding modules; and the first configuration parameter is used to indicate at least one of: the L coding modules, a coding sequence of the L coding modules, a maximum coding time of each coding module, a maximum quantity M of PMIs reported by the UE in one coding period, a PMI bit width of the third coding module, or a trigger condition for starting the first coding period.

7. The method according to claim 6, wherein the trigger condition comprises at least one of: a quantity of PMIs cumulatively reported by the UE in a second coding period being greater than a quantity M, the UE receiving first indication information from the network device, the UE sending second indication information to the network device, the UE continuously receiving acknowledgment (ACK) information a plurality of times from the network device, the UE detecting that a beam fails, the UE re-accessing or switching a cell, or a channel state being changed; wherein the first indication information and the second indication information are used to indicate the UE to start a new coding period, and the second coding period is a previous coding period of the first coding period.

8. The method according to claim 7, wherein the channel state being changed comprises at least one of: a channel environment between the UE and the network device being changed, quality of service required by the UE being changed, the UE detecting that information of a used channel state information reference signal (CSI-RS) is changed, the network device detecting that information of a used CSI-RS is changed, or the UE detecting that an antenna state is changed.

9. The method according to claim 6, wherein the first configuration parameter is specified in a protocol, predefined, configuration information used by the UE in a second coding period, or determined by the UE based on target information; wherein the second coding period is a previous coding period of the first coding period; and the target information is used to indicate at least one of: a channel environment between the UE and the network device, quality of service required by the UE, hardware configuration of the network device, or hardware configuration of the UE.

10. The method according to claim 9, wherein the channel environment between the UE and the network device is obtained by the UE by detecting a second channel, or obtained by the network device by detecting a third channel, or obtained by a sensing device of the UE, or obtained by the network device through a CSI report sent by the UE; wherein the second channel comprises at least one of: a physical downlink control channel (PDCCH), a physical downlink shared channel (PDSCH), a channel state information reference signal (CSI-RS), a demodulation reference signal (DMRS), a phase tracking reference signal (PTRS), a synchronization signal, or a physical broadcast channel (PBCH); and the third channel comprises at least one of: a physical uplink control channel (PUCCH), a physical uplink shared channel (PUSCH), a physical random access channel (PRACH), a sounding reference signal (SRS), a PTRS, or a DMRS.

11. The method according to claim 9, wherein the target information comprises at least one of: first information, second information, third information, or fourth information; wherein the first information is used to indicate the channel environment between the UE and the network device; wherein the first information comprises at least one of: transmission power, noise power, interference power, line-of-sight (LOS) transmission of a wireless signal, non-line-of-sight (NLOS) transmission of a wireless signal, time delay information, a scattering condition, channel time variation, a terminal moving speed, a terminal rotating speed, or a change speed of a shielding around a terminal;

the second information is used to indicate the quality of service required by the UE; and the second information comprises at least one of: an electric quantity, a throughput value, time delay information, a size of a data packet that needs to be transmitted, a bit error rate, a signal-to-noise ratio, or a signal to interference plus noise ratio;

the third information is used to indicate the hardware configuration of the network device; and the third information comprises at least one of: an antenna-related parameter of the network device or a processing capability information parameter of the network device; and the fourth information is used to indicate the hardware configuration of the UE; and the fourth information comprises at least one of: an antenna-related parameter of the UE or a processing capability information parameter of the UE; wherein the antenna-related parameter of the network device comprises at least one of: a quantity of antenna elements, a quantity of transceiver units (TXRUs), or a quantity of antenna panels; the processing capability information parameter of the network device comprises at least one of: a signal processing capability, a data calculation capability, a storage capability, a central processing unit (CPU), a graphics processing unit (GPU), or a neural network processing unit (NPU); the antenna-related parameter of the UE comprises at least one of: a quantity of antenna elements, a quantity of TXRUs, or a quantity of antenna panels; and the processing capability information parameter of the UE comprises at least one of: a signal processing capability, a data calculation capability, a storage capability, a CPU, a GPU, or an NPU.

12. The method according to claim 9, wherein the target information is obtained by the UE through higher layer signaling.

13. The method according to claim 6, wherein before the performing, based on a first configuration parameter, channel coding by using a third coding module to obtain a PMI, the method further comprises:
obtaining third indication information; wherein
the third indication information is used to indicate the first configuration parameter.

14. The method according to claim 13, wherein the obtaining third indication information comprises:
obtaining the third indication information after a fourth coding module completes coding; wherein
the fourth coding module is a previous coding module of the third coding module, and the fourth coding module is one of the L coding modules.

15. The method according to claim 14, wherein the third indication information is further used to indicate to change at least one piece of following information in an original configuration parameter of the third coding module: a PMI bit width of the third coding module, or a maximum quantity of PMIs reported by the UE in one coding period.

16. The method according to claim 13, wherein the obtaining third indication information comprises:
obtaining the third indication information before the first coding period starts.

17. The method according to claim 16, wherein the third indication information is further used to indicate to change at least one of following original configuration parameter of the third coding module: information used to indicate the L coding modules, information used to indicate a coding sequence of coding modules that perform coding in the first coding period, a maximum coding time of the third coding module, a maximum quantity of PMIs reported by the UE in one coding period, a PMI bit width of the third coding module, or a trigger condition for starting the first coding period; wherein
the first configuration parameter is a changed original configuration parameter.

18. A user equipment (UE), comprising a processor, a memory, and a computer program stored in the memory and executable on the processor, wherein the computer program, when executed by the processor, causes the UE to perform:
reporting N precoding matrix indicators (PMIs) to a network device; wherein
each PMI is corresponding to one channel; a first PMI comprises channel information of a channel corresponding to a second PMI; the first PMI is one of the N PMIs; and the second PMI is at least one of the PMIs corresponding to channels before a channel corresponding to the first PMI, wherein N is a positive integer greater than 1;
wherein the N PMIs correspond to L coding modules, and any coding module of the L coding modules obtains at least one PMI of the N PMIs;
coding of a first coding module is based on coding information of a second coding module;
the first coding module is one of the L coding modules; and
the second coding module is a coding module that performs coding before the first coding module, and L is a positive integer greater than 1.

19. The UE according to claim 18, wherein the coding information of the second coding module comprises at least one of: a channel state information reference signal (CSI-RS) corresponding to a first channel, intermediate state information for the second coding module to calculate a PMI, time domain correlation information of the CSI-RS, or frequency domain correlation information of the CSI-RS; wherein
the first channel is a channel corresponding to a PMI corresponding to the second coding module.

20. A network device, comprising a processor, a memory, and a computer program stored in the memory and executable on the processor, wherein the computer program, when executed by the processor, causes the network device to perform:
decoding N precoding matrix indicators (PMIs) received from a user equipment (UE) to obtain channel information of N channels; wherein
each PMI is corresponding to channel information of one channel; a first PMI comprises channel information of a channel corresponding to a second PMI; the first PMI is one of the N PMIs; and the second PMI is at least one of the PMIs corresponding to channels before a channel corresponding to the first PMI, and N is a positive integer greater than 1;
wherein the decoding N PMIs received from a UE to obtain channel information of N channels comprises:
decoding, by using Y decoding modules, the N PMIs received from the UE to obtain the channel information of the N channels; wherein
any decoding module of the Y decoding modules is corresponding to at least one of the N PMIs; and Y is a positive integer greater than 1;
wherein decoding of a first decoding module is based on decoding information of a second decoding module and/or coding information of a second coding module; the first decoding module is one of the Y decoding modules; the second decoding module is a decoding module before the first decoding module; and the second coding module is a coding module that performs coding before a coding module corresponding to the first decoding module.

* * * * *